US008548389B2

(12) United States Patent
Qi et al.

(10) Patent No.: US 8,548,389 B2
(45) Date of Patent: *Oct. 1, 2013

(54) SYSTEM AND METHODS FOR DETERMINING RADIATED RADIO FREQUENCY (RF) RECEIVER SENSITIVITY

(75) Inventors: Yihong Qi, Waterloo (CA); Qingmai Zhou, Waterloo (CA); Perry Jarmuszewski, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,770

(22) Filed: Sep. 12, 2012

(65) Prior Publication Data

US 2013/0003809 A1    Jan. 3, 2013

Related U.S. Application Data

(63) Continuation of application No. 13/437,520, filed on Apr. 2, 2012, now Pat. No. 8,326,232, which is a continuation of application No. 12/132,659, filed on Jun. 4, 2008, now Pat. No. 8,170,489.

(51) Int. Cl.
*H04B 17/00* (2006.01)
(52) U.S. Cl.
USPC ..................... 455/67.11; 455/63.1
(58) Field of Classification Search
USPC ........... 455/67.11, 63.1, 562.1, 561; 375/267
See application file for complete search history.

(56) References Cited

U.S. PATENT DOCUMENTS

| 6,308,065 B1 | 10/2001 | Molinari et al. |
| 6,587,671 B1 | 7/2003 | Kanago et al. |
| 6,737,904 B1 | 5/2004 | Butaud et al. |
| 6,839,657 B2 | 1/2005 | Verbeyst et al. |

(Continued)

FOREIGN PATENT DOCUMENTS

| EP | 1830493 | 9/2007 |
| WO | 2004054135 | 6/2004 |
| WO | 2006010026 | 6/2006 |

OTHER PUBLICATIONS

Van Blaricum et al., "A Technique for Extracting the Poles and Residues of a System Directly from Its Transient Response", IEEE Transactions on Antennas and Propagation, vol. AP-23, No. 6, Nov. 1975, pp. 777-781.

(Continued)

*Primary Examiner* — Lewis West
(74) *Attorney, Agent, or Firm* — Allen, Dyer, Doppelt, Milbrath & Gilchrist, P.A.

(57) ABSTRACT

A test method is for determining RF sensitivity of an RF receiver for a plurality of channels extending over a frequency band(s) using an RF source coupled to the RF receiver by an RF communications link. The plurality of channels may include channels having a predictable RF sensitivity and a channel(s) having a non-predictable RF sensitivity. The test method may include measuring an RF sensitivity for one or more of the channels having the predictable RF sensitivity, and generating a partial RF sensitivity function for the channels having the predictable RF sensitivity based thereon. The method may further include measuring an RF sensitivity for the channel(s) having the non-predictable RF sensitivity. Additionally, an overall RF sensitivity function may be generated for the plurality of channels based upon the partial RF sensitivity function, and based upon the measured RF sensitivity for the channel(s) having the non-predictable RF sensitivity.

21 Claims, 18 Drawing Sheets

(56) References Cited

U.S. PATENT DOCUMENTS

| | | |
|---|---|---|
| 6,954,643 B2 | 10/2005 | Petrus |
| 6,980,824 B2 | 12/2005 | Hsu et al. |
| 7,254,755 B2 | 8/2007 | De Obaldia et al. |
| 7,286,961 B2 | 10/2007 | Kildal |
| 7,555,294 B2 | 6/2009 | Qi et al. |
| 7,555,295 B2 | 6/2009 | Qi et al. |
| 7,873,339 B2 | 1/2011 | Qi et al. |
| 8,170,489 B2 * | 5/2012 | Qi et al. ............. 455/67.11 |
| 8,326,232 B2 * | 12/2012 | Qi et al. ............. 455/67.11 |
| 2001/0026150 A1 | 10/2001 | Klenner |

OTHER PUBLICATIONS

Foegelle, "Antenna Pattern Measurement: Theory and Equations", Compliance Engineering 2002 Reference Guide, available at www.ce-mag.com/archive/02/Spring/fogelle2.html, pp. 1-13.

"CTIA test requirements cover over-the-air performance", OTA Tests, wireless Europe, Oct./Nov. 2004, pp. 1-2.

"CTIA certification, method of measurement for radiated RF power and receiver performance", Test Plan for Mobile Station Over the Air Performance, Mar. 2005, pp. 1-144.

"CTIA certification program, cellular communications & internet association method of measurement for radiated RF power and receiver performance", Test Plan for Mobile Station Over the Air Performance, Mar. 2003, pp. 1-108.

Universal Radio Communication Tester R&S CMU200, Rohde & Schwarz, available at www.rohde-schwarz.com, 2004, pp. 1-45.

Circadiant Tech Brief, Sensitivity Measurement Algorithms, Jan. 2003, pp. 1-3.

GSM RF Performance Evaluation (Antenna Testing) Pocket Guide, Cetecom, Apr. 2004, pp. 1-2.

De Raadt et al., "Cryptography in OpenBSD: An Overview", In Proc. of the. 1999 USENIX Annual Technical Conference, Freenix Track, Jun. 1999, pp. 93-101.

* cited by examiner

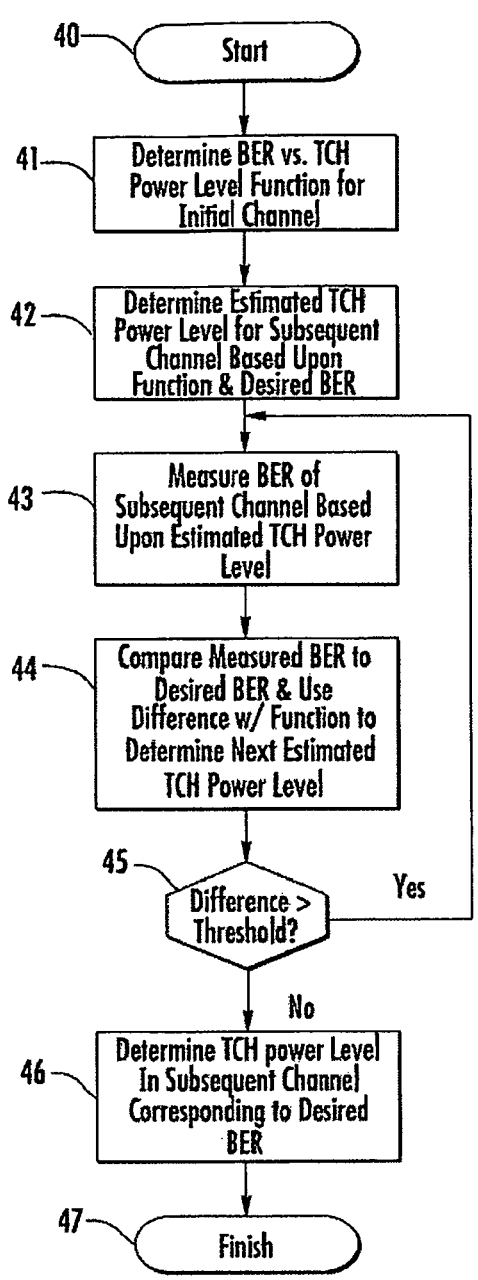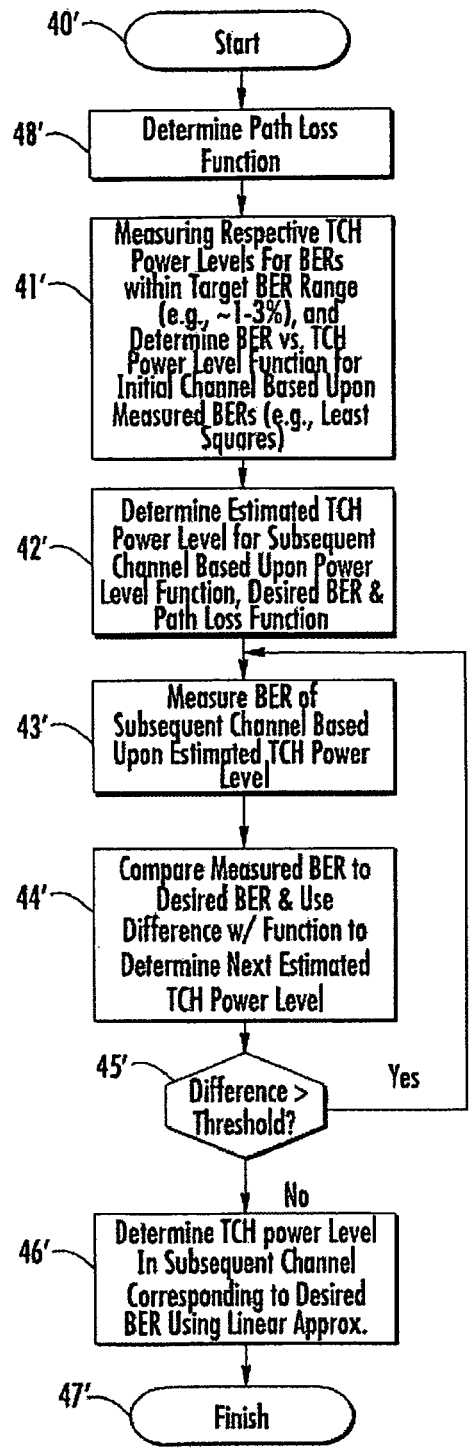
FIG. 3
FIG. 4

SYSTEM AND METHODS FOR DETERMINING RADIATED RADIO FREQUENCY (RF) RECEIVER SENSITIVITY

FIELD OF THE INVENTION

The present invention relates to the field of communications systems, and, more particularly, to performance testing in mobile wireless communications systems, such as cellular communications systems, and related methods.

BACKGROUND OF THE INVENTION

In cellular communications devices, radio sensitivity is a fundamental figure characterizing radio receiver performance. Conducted (i.e., via an RF cable) and radiated (i.e., via a wireless communications link) radio sensitivity measurements are performed frequently during radio design, certification, and verification. These measurements are performed by reducing the base station power transmit level until the receiver residual bit error ratio (RBER) reaches a desired level, specifically 2.44%.

For Global System for Mobile communication (GSM) mobile devices, for example, there are several communications bands each ranging from at least one hundred channels to almost four hundred. To scan every channel of a GSM mobile phone requires large amounts of time using traditional, semi-intuitive methods. Automated methods replicating manual estimation tend to be random or follow binary-tree search methodology.

BRIEF DESCRIPTION OF THE DRAWINGS

FIGS. 3-5 are flow diagrams of exemplary methods for RF receiver sensitivity measurement in accordance with the invention.

DETAILED DESCRIPTION OF EXEMPLARY EMBODIMENTS

Figure 1:
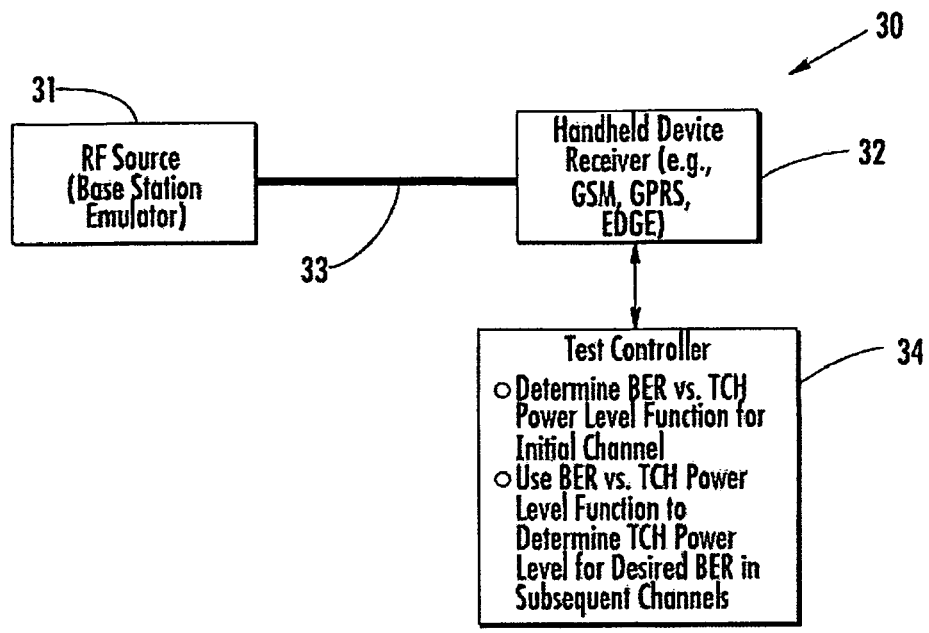
FIG. 1 is a schematic block diagram of an exemplary test system for measuring conducted radio frequency (RF) receiver sensitivity in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

A test method for determining radio frequency (RF) sensitivity of an RF receiver for a plurality of channels extending over at least one frequency band using an RF source coupled to the RF receiver by an RF communications link is described herein. The plurality of channels may include channels having a predictable RF sensitivity and at least one channel having a non-predictable RF sensitivity. The test method may include measuring an RF sensitivity for at least one channel having the predictable RF sensitivity, and generating a partial RF sensitivity function for the channels having the predictable RF sensitivity based thereon. The method may further include measuring an RF sensitivity for the at least one channel having the non-predictable RF sensitivity. Additionally, an overall RF sensitivity function may be generated for the plurality of channels based upon the partial RF sensitivity function, and based upon the measured RF sensitivity for the at least one channel having the non-predictable RF sensitivity.

More particularly, the test method may further include determining a bit error rate (BER) versus traffic channel (TCH) power level function based upon the measured RF sensitivity for the at least one channel having the predictable RF sensitivity. As such, generating the partial RF sensitivity function may include generating the partial sensitivity function based upon the BER versus TCH power level function. Additionally, determining the BER versus TCH power level function for the at least one channel may include measuring respective TCH power levels for a plurality of BERs within a target BER range, and determining the BER versus TCH power level function based upon the measured BERs in the target BER range.

Furthermore, measuring the RF sensitivity for the at least one channel having the predictable RF sensitivity may include measuring the RF sensitivity for at least some of the channels having the predictable RF sensitivity. The RF receiver may include at least one RF receiver clock, and the at least one channel having the non-predictable RF sensitivity may include at least one channel having a frequency corresponding to a harmonic frequency of the at least one RF receiver clock.

The test method may further include determining a path loss function for the plurality of channels. As such, generating the partial RF sensitivity function may include generating the partial RF sensitivity function based upon the measured RF sensitivity for the at least one channel having the predictable RF sensitivity and the path loss function. More particularly, determining the path loss function comprises determining the path loss function may be based upon at least some of the plurality of channels. By way of example, determining the path loss function may include determining the path loss function based upon a least squares algorithm, using a plurality of splines, etc. Also, the RF receiver may include at least one of a Global System for Mobile Communications (GSM) receiver, a General Packet Radio Service (GPRS) receiver, and an Enhanced Data Rates for Global System for Mobile Communications (GSM) Evolution (EDGE) receiver, for example.

A related test system for determining radio frequency (RF) sensitivity for a plurality of channels extending over at least one frequency band and comprising channels having a predictable RF sensitivity and at least one channel having a non-predictable RF sensitivity is also provided. The test system may include an RF receiver, an RF source, an RF communications link coupling the RF source to the RF receiver, and a test controller coupled to the RF receiver. The test controller may be for measuring an RF sensitivity for at least one channel having the predictable RF sensitivity, and generating a partial RF sensitivity function for the channels having the predictable RF sensitivity based thereon. The test controller may further measure an RF sensitivity for the at least one channel having the non-predictable RF sensitivity. Additionally, the test controller may also generate an overall RF sensitivity function for the plurality of channels based upon the partial RF sensitivity function, and based upon the measured RF sensitivity for the at least one channel having the non-predictable RF sensitivity.

Generally speaking, methods and test systems are provided herein for determining conducted and radiated receiver sensitivity which use a channel information-based search approach, which creates a fast sensitivity search for GSM or other mobile devices. The RBER vs. normalized TCH transmit level is largely determined by the modulation method and digital signal processor (DSP) code. Measurement of a range of this data creates a curve or function showing the characteristics of the receiver near the target RBER. The compiled data for one channel applies to all channels within the same band. This curve allows predictive, rather than estimated, transmit level change within its boundaries.

The sensitivity measurement is defined as the transmit (TX) power at which the mobile reports a Class II RBER of 2.44 percent or less. Often the calibrated base station transmit power is decreased until the desired RBER is achieved. To correctly measure device sensitivity in a conducted mode, accurate cable path loss needs to be determined across the channels in question. Within the desired bands, a random channel may be selected as representative. The lower and upper limits of the RBER scan range are selected. The lower limit is selected to minimize high Gaussian and other random noise error susceptibility at very low RBER. Generally speaking, it is desirable that this be sufficiently low to maintain a large overall scan range. The upper limit is selected to protect against terminated mobile calls while maintaining large overall scan range. The lower RBER limit can be found through various search methods, as will be appreciated by those skilled in the art.

Bit error measurements within the above-noted limits use the highest transmit level resolution. Decreasing resolution decreases prediction accuracy over a non-linear system. The values are compiled with the TCH transmit level normalized. Random noise and bit error ratio modify the exact data curve. One approach is to apply a least-squares fitting to create the appropriate fast search curve. Because of the nature of the modulation, the normalized curve will have the form of $y=Ce^{bx}$ between the lower and upper limits, where y is the bit error ratio, x is the normalized TCH transmit level, and C and b are values derived from curve fitting, as will be discussed further below.

Figure 18:
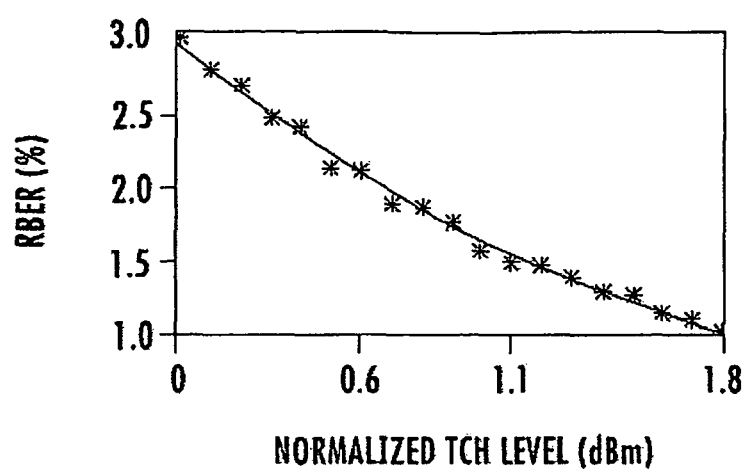
FIG. 18 is a graph of BER vs. normalized TCH level function.

An example of an RBER vs. normalized TCH level curve is shown in FIG. 18. The points are the measurement data, and the line is the result of the curve fitting. For all other channels, points on the normalized curve are determined using a "leapfrog" method. The leapfrog amount is within the range from the lower to the upper limit. Consecutive channel sensitivities often narrowly differ.

Within the curve range, based on the information of the least squares curve, the change in transmit level is calculated. The new transmit level is then applied to the base station emulator, and the achieved RBER target (2.44%) is confirmed through measurement. Any deviation is corrected via reapplication of the normalized curve and a successive confirmation measurement. Increasingly small target to actual deviation increases accuracy through linearity, and deviation from expected values is minimal.

Referring initially to FIG. 1, a test system 30 for measuring conducted receiver sensitivity is first described. The system 30 illustratively includes an RF test source 31 coupled to a handheld device receiver 32 to be tested via an RF cable 33. By way of example, the handheld device receiver 32 may be a Global System for Mobile Communications (GSM) receiver, a General Packet Radio Service (GPRS) receiver, and/or an Enhanced Data Rates for Global System for Mobile Communications (GSM) Evolution (EDGE) receiver, for example. Of course, other suitable wireless receivers may also be used.

In addition, the RF source 31 may be one of a Rohde and Schwartz universal radio communication tester GMU 200 or an Agilent 8960 base station emulator, for example, although other suitable emulators and/or RF test sources may also be used. A test controller 34 is connected to the handheld device receiver 32 for performing various test operations and measurements, which will be discussed in further detail below. It should be noted that while the RF source 31 and test controller 34 are illustrated as separate components in the FIG. 1, the functions of the RF source and test controller may in fact be performed by the same base station emulator, for example. Alternately, the test controller 34 could be a computer or computing device separate from the RF source 31, as will be appreciated by those skilled in the art.

Path loss plays an important role in the accuracy of a radio conducted sensitivity measurement as will be appreciated by those skilled in the art. One difficulty of performing a path loss measurement in a test configuration, however, is that typical base station emulators only report a receiver accuracy level of ±1 dB, as noted above, even though the internal amplifier of the receiver 32 may have much greater accuracy, for example, of about ±0.1 dB. By obtaining sign change information in the receiver power level, the path loss accuracy can therefore be improved to ±0.1 dB, as will be discussed further below.

In the case of a conducted receiver sensitivity test, the path loss of the cable 33 that connects the receiver 32 and the base station emulator 31 can be well calibrated. One relatively straightforward accurate path loss measurement involves changing the internal amplification of the receiver 32 by 0.1 dB increments until the desired RSSI edge point is obtained. However, if the starting point is 0.9 dB from the edge point, it will take many steps and, therefore, increased measurement time to find the edge point. Accordingly, more complex test schemes may be used to reduce the number of steps that will be required on average to find the edge point and, therefore, reduce test times.

Figure 9:
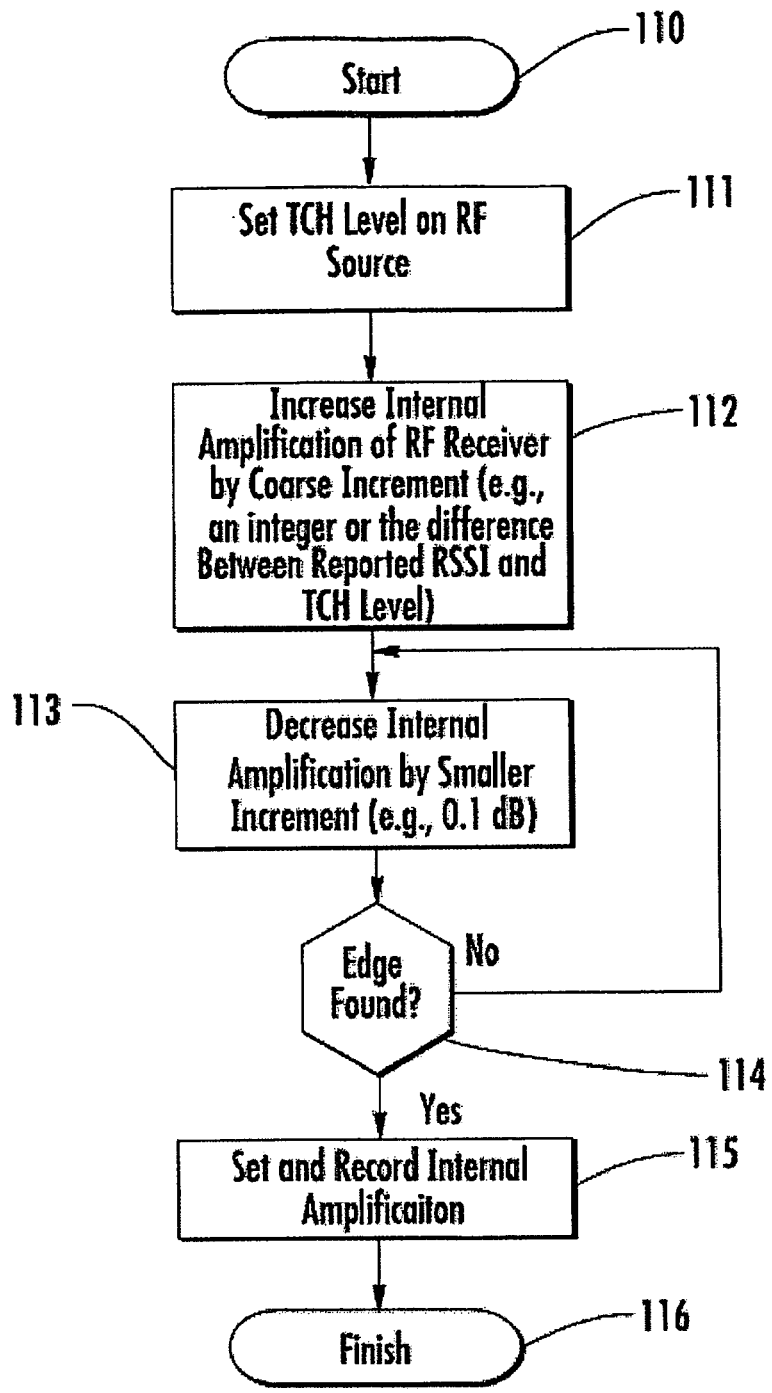
FIGS. 9-13 are flow diagrams of additional exemplary methods for determining RF path loss in accordance with the invention.

For example, one slightly more complex approach is illustrated in FIG. 9. Beginning at Block 110, the desired TCH power level is first set on the RF source 31, at Block 111. The internal amplification level of the receiver 32 is first changed by a coarse increment, such as the difference between the reported RSSI of the receiver and the TCH power level or other integer value, at Block 112. The edge is then found by changing the internal amplification level of the receiver using a fine increment (e.g., 0.1 dB) until the edge transition is observed to provide the path loss, at Blocks 113-114, at which point the internal amplification value of the receiver 32 may be set and/or recorded (Block 115), thus concluding the illustrated method (Block 116).

Stated alternatively, the "coarse" search changes the internal amplification by the difference between TCH level and reported RSSI. Since in the present example the reported RSSI is an integer value, this gives an accuracy of ±1 dB. The "fine" search then determines the edge between two consecutive RSSI readings.

Other variations of the coarse-fine edge point detection approach may also be used. Generally speaking, the coarse portions of these searches are fairly similar, so particular attention will be given herein to the variations in the fine search that may be used as appropriate for a given implementation. A fine search generally includes three stages. First, the RSSI is set to the desired level by adjusting the internal amplification and the TCH level of the base station emulator. Next, the internal amplification is changed in a series of successively decreasing increments to find the edge. These increments should narrow to 0.1 dB (or the accuracy of the given internal amplifier) to ensure the accuracy is also 0.1 dB. Finally, it may be necessary to "step back" to the edge point, as the measurements may have left off 0.1 dB from the desired RSSI.

Figure 10:
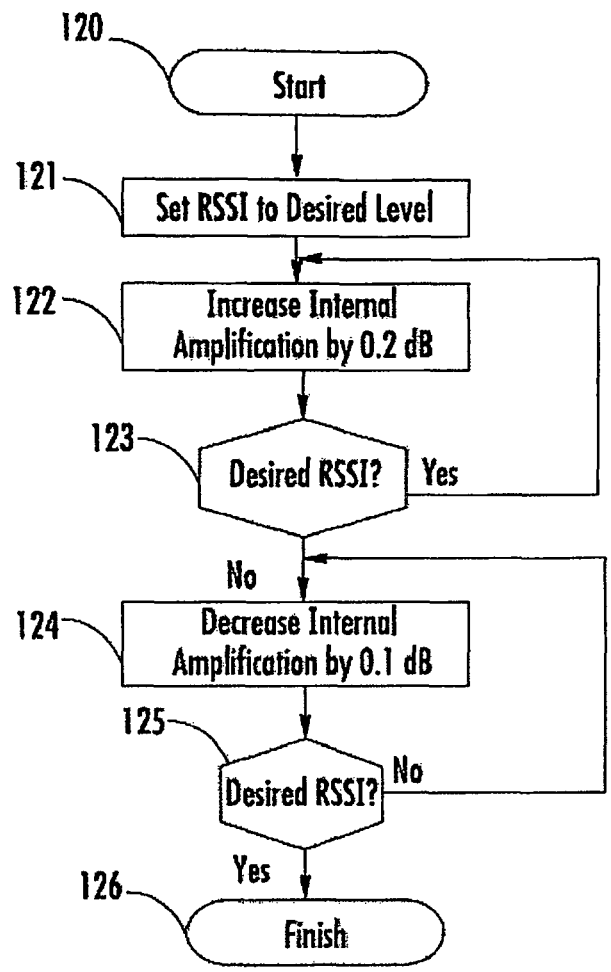

Another example of a fine search is now described with reference to FIG. 10. Beginning at Block 120, the RSSI is set to the desired level, at Block 121, and the internal amplification changed in 0.2 dB increments until the desired RSSI is no longer reported, at Blocks 122-123. That is, after a number of steps (typically between one and five), the returned RSSI will not match the desired level since the internal amplification will have jumped the edge by 0.1 or 0.2 dB. Thus, decreasing or "stepping back" the internal amplification level in 0.1 dB increments will find the edge point either in one or two steps, at Blocks 124-125 (depending upon whether the edge was jumped by 0.1 or 0.2 dB), thus concluding the illustrated method (Block 126).

Figure 11:
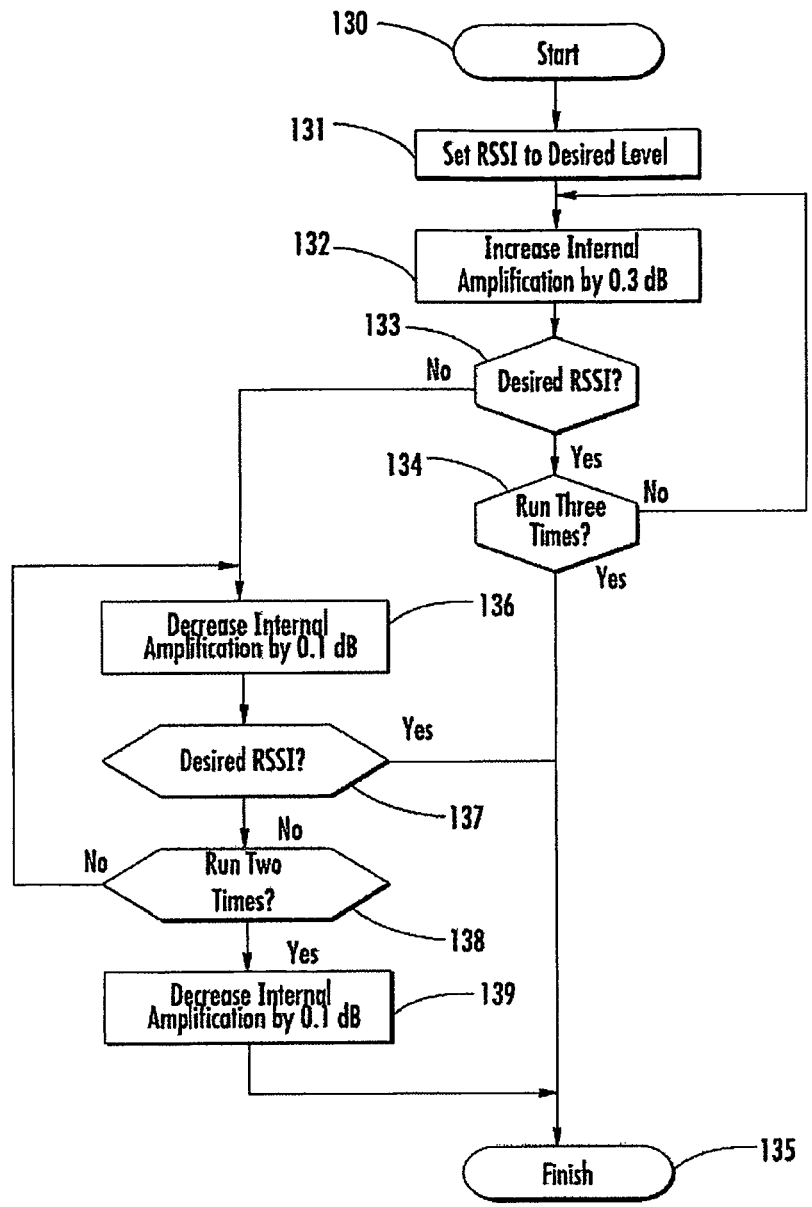

Another fine search process is now described with reference to FIG. 11. Beginning at Block 130, the RSSI is set to the desired level, as discussed above, and then the internal amplification is increased by 0.3 dB increments until the RSSI is no longer the desired value, at Blocks 131-133. Once the RSSI changes, two consecutive 0.1 dB scans will yield a change in RSSI, thus locating an edge, at Blocks 136-138, and the internal amplification is decreased by 0.1 dB (Block 139), thus concluding the illustrated method. For example, if the sum total change is 0.1 dB (e.g. +0.2 and then −0.1 dB, totaling +0.1 dB) and this produces a change in RSSI, an edge has been found. Alternatively, if the internal amplification is changed three times (i.e., 0.9 dB) without the RSSI changing from the desired value, at Block 134, an edge is also located, as a 1.0 dB change will change the RSSI since they are reported in integers.

Figure 12:
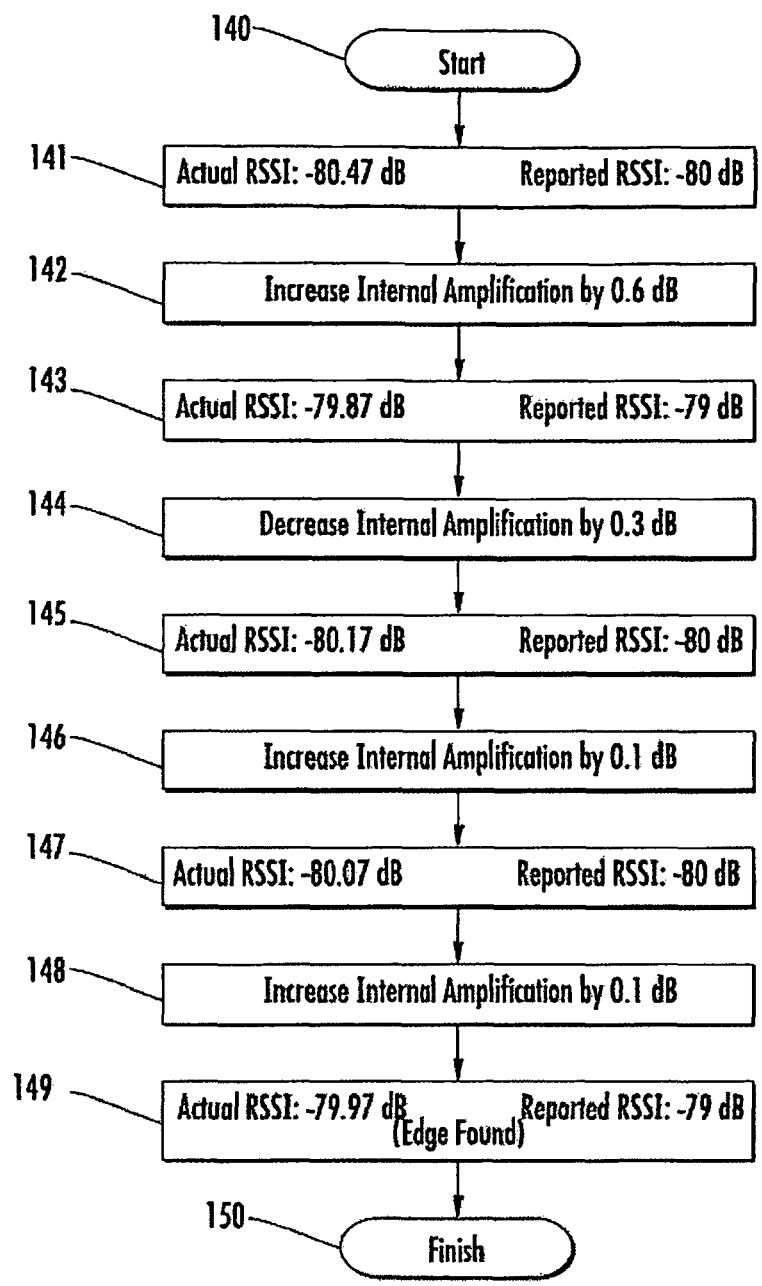

Another exemplary approach is now described with reference to FIG. 12. Beginning at Block 140, a starting actual RSSI value is −80.47 dB, and the reported RSSI is −80 db (Block 141). The internal amplification is then increased by 0.6 dB, at Block 142, changing the actual RSSI value to −79.87 dB, and the reported RSSI to −79 db (Block 143), indicating that the edge has been crossed. The next step is a 0.3 dB decrease, at Block 144, which changes the actual RSSI value to −80.17 dB, and the reported RSSI back to −80 db (Block 145), indicating the edge has been crossed back over. As such, the internal amplification is increased by 0.1 dB, at Block 146, changing the actual RSSI value to −80.07 dB, and the reported RSSI remains at −80 db (Block 147), meaning the edge was not crossed. Accordingly, another 0.1 dB increase is performed (Block 148), which changes the actual RSSI value to −79.97 dB, and also changes the reported RSSI to −79 dB, thus locating the edge (Block 149), and concluding the illustrated method, at Block 150.

It will be appreciated by those skilled in the art that many different edge location schemes may be used. The first, and each successive, jump is typically any number from 0.1 to 0.9 dB. Jump values can change or remain constant for each step. To choose an appropriate method for a given application, variation of the data and average performance are important considerations. For example, with relatively "flat" data the approach illustrated in FIG. 9 may locate the edge quicker than the approach illustrated in FIG. 10, but the opposite may be true for "sloped" data, potentially by up to three steps.

Figure 13:
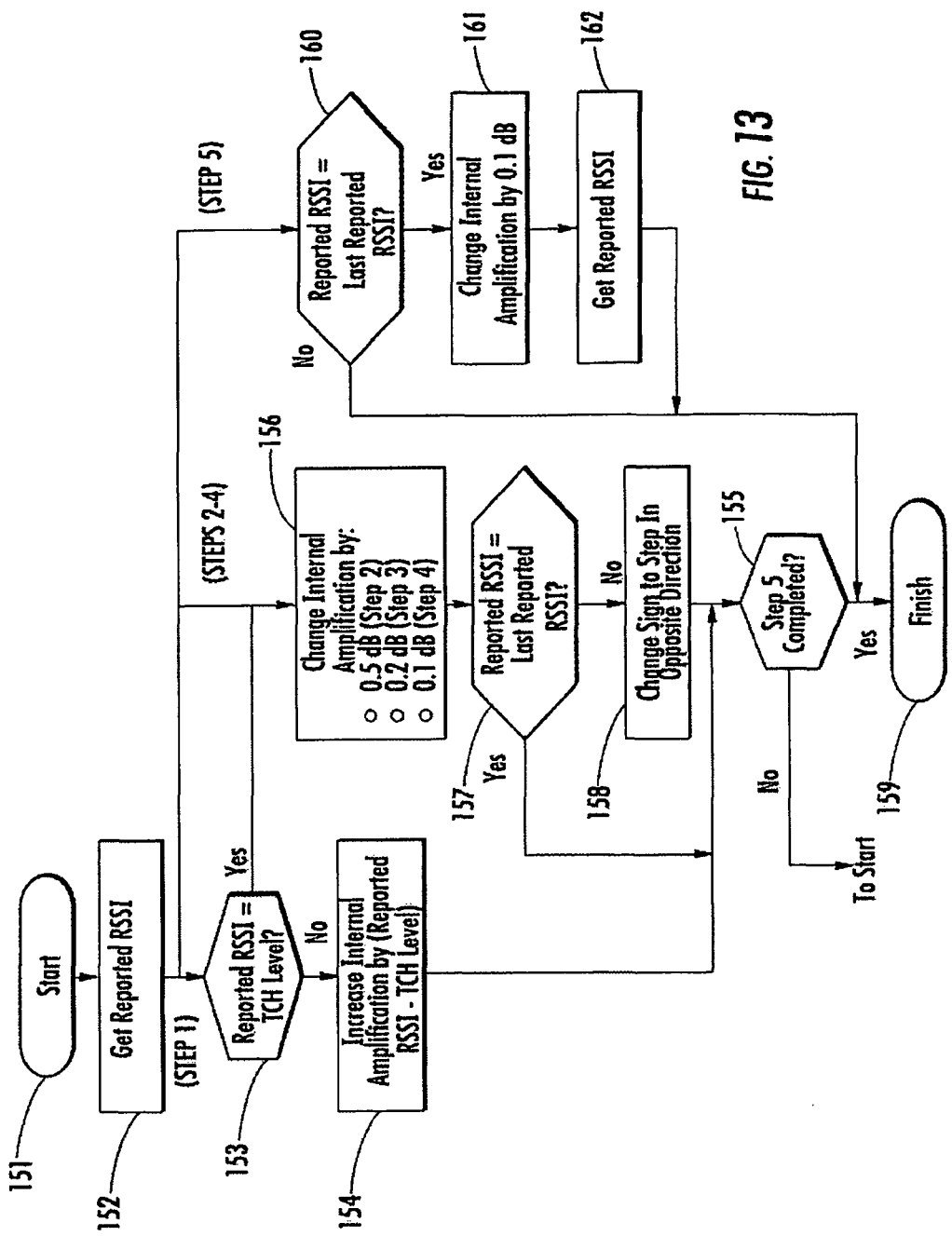

Still another approach now described with reference to FIG. 13 is a five-step path loss scheme. Beginning at Block 151, the reported RSSI for a given TCH level is obtained, at Block 152. The first step includes determining if the reported RSSI is the same as the TCH level, at Block 153. If so, the method proceeds to step two. If not, the internal amplification is increased (or decreased depending upon the particular implementation) by the difference of the reported RSSI minus the given TCH level, at Block 154. The new reported RSSI is then obtained (Block 152), and for steps two through four the internal amplification is changed in successively decreasing increments of 0.5 dB, 0.2 dB, and 0.1 dB, at Block 156.

If the reported RSSI is not the same as the last reported RSSI after each of these changes, then the sign is changed before the next step (Block 158) to step in the opposite direction (i.e., back toward the edge). Once the first four steps are completed, the fifth step involves once again determining if the reported RSSI is the same as the last reported RSSI, at Block 160, and if so changing the internal amplification by 0.1 dB once again (which will be the edge) and obtaining the reported RSSI, at Blocks 161, 162, to conclude the illustrated method (Block 159). This approach is advantageous in that it will converge on the edge point within five steps, which provides good overall results for different curve types.

Use of a path loss search in a test method for determining conducted radio frequency (RF) receiver sensitivity for a plurality of channels extending over one or more frequency bands will now be described with reference to FIGS. 3 and 4. As will be appreciated by those skilled in the art, receiver sensitivity is defined based upon a traffic channel (TCH) power level at a desired bit error rate (BER). BER is an "end-to-end" performance measurement which quantifies the reliability of the entire radio system from "bits in" to "bits out," including the electronics, antennas and signal path in between.

Aside from the relatively poor reporting accuracy of receiver test equipment, another difficulty in determining receiver sensitivity is that it can be a very time consuming process. That is, there are typically numerous channels within a cellular band, and a cellular device may operate over multiple bands, as noted above. Thus, a sensitivity measurement covering all of the channels used by a device may take many hours, and even days, to complete.

To reduce receiver sensitivity measurement times, a relatively fast sensitivity search algorithm may be used. Beginning at Block 40, if the path loss of the RF cable 33 is not already known, using one of the above-described path loss searches (or others) a path loss function may advantageously be determined, at Block 48'. More particularly, path loss associated with the RF cable 33 will be different for different channels (i.e., frequencies), but there will be a generally linear relation between these path loss values. Accordingly, by determining the path loss of two separate channels (e.g., the first and last channels in the band), a linear path loss function for the RF cable 33 can be quickly generated. This provides a quick and accurate approximation of path losses for all of the channels, although the path loss for each channel could be measured separately in some embodiments, if desired.

Furthermore, a BER versus TCH power level function is determined for an initial channel, at Block 41. The initial channel could be any channel in the band, but for explanation purposes it will be assumed to be the first channel in the band. It has been found that given enough sampling frames, the general shape of the TCH power level vs. BER function for a given channel in a frequency band will be essentially the same for all of the remaining channels in the band. This is due to fact that the function is determined by the modulation scheme and digital signal processing (DSP) algorithm of the handheld device. By way of example, GPRS has a GMSK modulation scheme. Since the relationship for BER vs. energy per bit has an exponential form, the BER vs. TCH level function also takes the form of an exponential. Thus, once the shape of this function is found for one channel, this function can be used to rapidly locate the TCH level/target BER point for each of the following channels, as will be discussed further below.

In particular, the BER versus TCH power level function is determined for the initial channel by measuring respective TCH power levels for a plurality of BERs within a target BER range, and determining the BER versus TCH power level function based upon the measured BERs in the target BER range (i.e., curve fitting based upon the measured values) at Block 41'. Typically speaking, only BER values within a particular target range will be of interest because values outside of this range will result in dropped connections, etc. By way of example, the target range may be about one to three percent, although other target ranges may be appropriate for different applications. Various curve fitting approaches, such as a least squares approach, for generating the BER versus TCH power level function will be discussed further below.

To find the edges of the BER target range, a coarse search may be used that involves stepping the TCH power level in relatively coarse negative increments (e.g., −1.5 db) when the measured BER is less than 0.5, and relatively coarse positive increments (e.g., +2.0 dB) when the measured BER is greater than 3.0. This gives a relatively close approximation of the target range edge points, and successive measurements within the target range may then be made at relatively fine TCH power level increments (e.g., 0.1 dB increments) to provide the data points for curve fitting.

Curve fitting is appropriate because BER data is often accompanied by noise. Even though all control parameters (independent variables) remain constant, the resultant outcomes (dependent variables) vary. A process of quantitatively estimating the trend of the outcomes, also known as curve fitting, therefore becomes useful. The curve fitting process fits equations of approximating curves to the raw field data, as will be appreciated by those skilled in the art.

As noted above, the data for the BER vs. TCH level function is generally exponential. Two exemplary curve-fitting approaches that may be used to fit an exponential curve are a least square polynomial approximation and a non-linear (i.e., exponential) least square approximation. The theory and implementation of a least square polynomial approximation is first described. Since polynomials can be readily manipulated, fitting such functions to data that does not plot linearly is common. In the following example, n is the degree of polynomial and N is the number of data pairs. If N=n+1, the polynomial passes exactly through each point. Therefore, the relationship N>n+1 should always be satisfied.

Assuming the functional relationship $$y = a_0 + a_1 x + a_2 x^2 + \ldots + a_n x^n,$$

with errors defined by $$e_i = Y_i - y_i = Y_i - a_1 x - a_2 x_i^2 - \ldots - a_n x_i^n,$$

where $Y_i$ represents the observed or experimental value corresponding to $x_i$, with $x_i$ free of error, the sum of squares of the errors will be $$S = \sum_{i=1}^{N} e_i^2 = \sum_{i=1}^{N} (Y_i - a_0 - a_i x - a_i x^2 - \ldots - a_n x_i^n)^2.$$

At a minimum, the partial derivatives $$\frac{\delta S}{\delta a_0}, \frac{\delta S}{\delta a_1}, \ldots, \frac{\delta S}{\delta a_n}$$

are zero.

Writing the equations for these terms gives n+1 equations as follows:

$$\frac{\delta S}{\delta a_1} = \sum_{i=1}^{N} 2(Y_i - a_0 - a_1 x_i - \ldots - a_i x_i^n)(-1)$$

$$\frac{\delta S}{\delta a_0} = \sum_{i=1}^{N} 2(Y_i - a_0 - a_1 x_i - \ldots - a_i x_i^n)(-x_i)$$

$$\vdots$$

$$\frac{\delta S}{\delta a_n} = \sum_{i=1}^{N} 2(Y_i - a_0 - a_1 x_i - \ldots - a_i x_i^n)(-x_i^n).$$

Dividing each equation by −2 and rearranging gives n+1 normal equations to be solved simultaneously:

$$a_0 N + a_1 \sum x_i + a_2 \sum x_i^2 + \ldots + a_n \sum x_i^n = \sum Y_i$$

$$a_0 \sum x_i + a_1 \sum x_i^2 + a_2 \sum x_i^3 + \ldots + a_n \sum x_i^{n+1} = \sum x_i Y_i$$

$$a_0 \sum x_i^2 + a_1 \sum x_i^3 + a_2 \sum x_i^4 + \ldots + a_n \sum x_i^{n+2} = \sum x_i^2 Y_i$$

$$\vdots$$

$$a_0 \sum x_i^n + a_1 \sum x_i^{n+1} + a_2 \sum x_i^{n+2} + \ldots + a_n \sum x_i^{2n} = \sum x_i^n Y_i.$$

Putting these equations in matrix form reveals a notable pattern in the coefficient matrix:

$$\begin{bmatrix} N & \sum x_i & \sum x_i^2 & \sum x_i^3 & \ldots & \sum x_i^n \\ \sum x_i & \sum x_i^2 & \sum x_i^3 & \sum x_i^4 & \ldots & \sum x_i^{n+1} \\ \sum x_i^2 & \sum x_i^3 & \sum x_i^4 & \sum x_i^5 & \ldots & \sum x_i^{n+2} \\ \vdots & \vdots & \vdots & \vdots & \vdots & \vdots \\ \sum x_i^n & \sum x_i^{n+1} & \sum x_i^{n+2} & \sum x_i^{n+3} & \ldots & \sum x_i^{2n} \end{bmatrix} * \begin{bmatrix} a_0 \\ a_1 \\ a_2 \\ \vdots \\ a_n \end{bmatrix} = \begin{bmatrix} \sum Y_i \\ \sum x_i Y_i \\ \sum x_i^2 Y_i \\ \vdots \\ \sum x_i^n Y_i \end{bmatrix}$$

This matrix equation is called the normal matrix for the least-square problem. In this equation $a_0, a_1, a_2 \ldots a_n$ are unknown coefficients while $x_i$ and $Y_i$ are given. The unknown coefficients $a_0, a_1, a_2 \ldots a_n$ can hence be obtained by solving the above matrix equations.

To fit the curve $Y_i$, it is required to know what degree of polynomial should be used to best fit the data. As the degree of polynomial is increased, the deviations of the point from the curve is reduced until the degree of polynomial, n, equals N−1. At this point, there is an exact match. In terms of statistics, the degree of approximating the polynomial is increased as long as there is a statistically significant decrease in the variance, $\sigma^2$, which is computed by:

$$\sigma^2 = \sum \frac{e_i^2}{N-n-1}.$$

The approach illustrated above was programmed in two exemplary implementations using C++ and the normal matrix was solved using two different methods, namely the Gauss-Jordan approach and LU decomposition, as will be appreciated by those skilled in the art. Although both of these methods produced comparable results, the LU decomposition method was found to be more desirable for the least square polynomial approximation program because LU decomposition provided desired performance results.

The above noted C++ program was implemented so that it is able to calculate the coefficient of the approximated curve fitting equation of varying degree. Polynomials with degrees of 2, 3, 4 and 5 were used to fit a curve against BER data values, and it was found that third degree polynomial produced the most advantageous results. More particularly, degrees higher than three did not show any significant improvement in the fitted curve. Therefore, a third degree polynomial was used to fit the curve against BER data values.

The theory and implementation of fitting non-linear curves using a least squares approach will now be described. In many cases data obtained from experimental tests is not linear. As such, it is necessary to fit some other function than a first-degree polynomial to this data. Some common forms that may be used are exponential forms of a type $y=ax^b$ or $y=ae^{bx}$.

Normal equations for these forms can again be developed by setting the partial derivatives equal to zero, but such nonlinear simultaneous equations are much more difficult to solve than linear equations. Because of this, these forms are usually linearized by taking logarithms before determining the parameters, for example, $\ln y = \ln a + b \ln x$, or $\ln y = \ln a + bx$. Then, a new variable is introduced, i.e., $z = \ln y$ as a linear function of $\ln x$ or $x$. In this case, instead of minimizing the sum of squares of the deviations of Y from the curve, deviations of ln Y are minimized. To find which form of curve best fits the BER data, MathCAD mathematical software was used. A BER curve was plotted using MathCAD and different forms of the curve were fitted against the BER data. It was found that an exponential curve defined by $y=ce^{ax}$ provided a desirable fit for the BER data, although other functions may provide desired results in different implementations.

Data linearization is used to fit a curve of type $y=ce^{ax}$ to the data points given as $(x_1,y_1), (x_2,y_2), \ldots (x_N,y_N)$, where x is the independent variable, y is the dependent variable, and N is the number of x,y pairs. To linearize the data, a logarithm of both sides is taken, i.e., $\ln y = \ln c + ax$. Then a change of variable is introduced, namely $X=x$ and $Y=\ln(y)$, which produces the equation $Y=a/X+\ln(c)$. This equation is a linear equation in the variables X and Y, and it can be approximated with a "least square line" of the form $Y=AX+B$. However, in this case, $\ln(y)$ will be used for performing least square approximation instead of y. Comparing the last two equations, it is noticed that $A=a$ and $B=\ln(c)$. Thus, $a=A$ and $c=e^b$ are used to construct the coefficients which are then used to fit the curve $y=ce^{ax}$.

Figure 14:
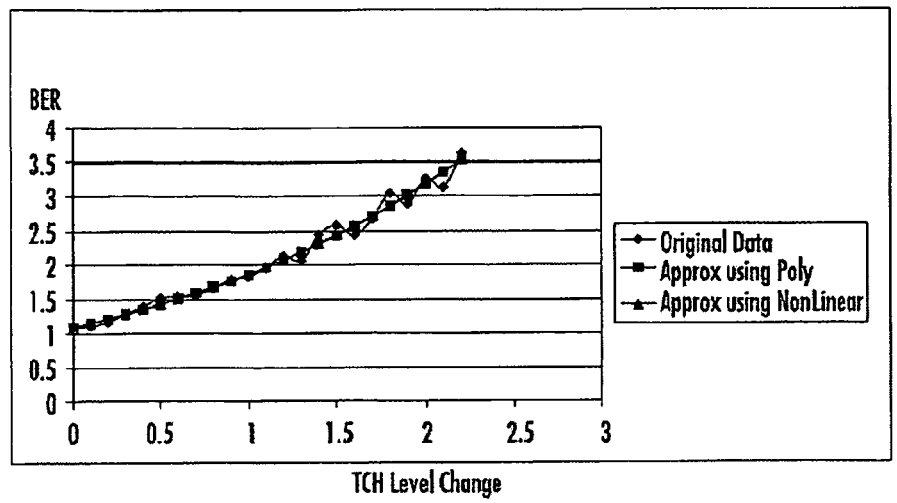
FIGS. 14 and 15 are graphs of BER versus TCH power level change for different sets of data, as well as corresponding BER versus TCH power level functions therefore, in accordance with the present invention.
Figure 15:
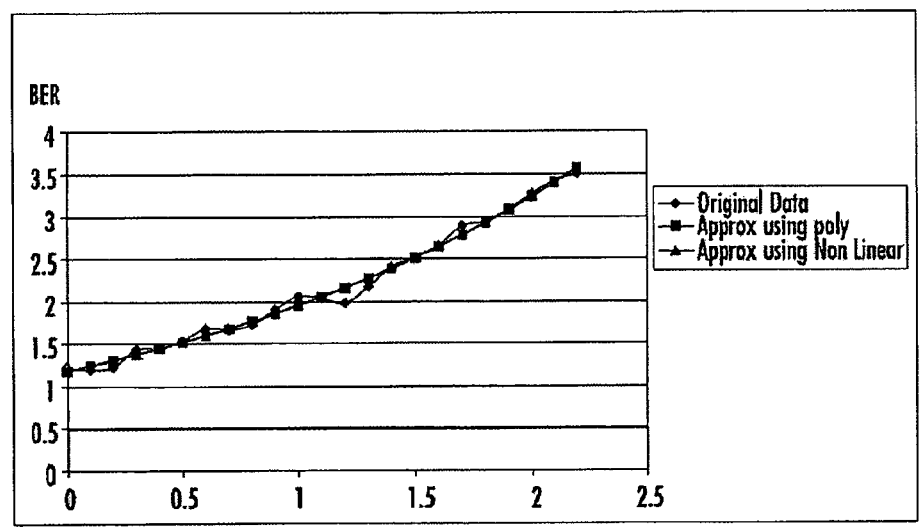

This approach was again programmed in C++. The normal matrix to be solved for this method was only 2×2, which was solved with a relatively high degree of accuracy. Plotted curves for two different sets of data using this approach are illustrated in FIGS. 14 and 15.

Both of the nonlinear exponential least square and least square polynomial approaches described above approximated the original data with a relatively high degree of accuracy. Generally speaking, the margin of error of the curves generated using these approaches will result in less than a 0.1 dB margin of error in the sensitivity measurement. In addition, the results provided by these methods are also very close to one another. Below are the results obtained by performing exponential and least square polynomial approximation on the two sets of data, namely data set 1 and data set 2. Here 'S' represents the standard error and 'R' represents the Correlation Coefficient.

Results for data set 1:
  3rd degree Polynomial Fit: $y=a+bx+cx^2+dx^3$ . . . .
  Coefficient Data:
  a=1.075334 S=1.720
  b=0.653063 R=0.99168
  c=0.097339
  d=0.048979
  Exponential Fit: $y=ae^{bx}$
  Coefficient Data:
  a=1.092514 Standard Error(S)=1.690
  b=0.533035 correlation coefficient (R)=0.99158
Results for data set 2:
  3rd degree Polynomial Fit: $y=a+bx+cx^2+dx^3$.
  Coefficient Data:
  a=1.192487 S=1.101
  b=0.565984 R=0.99592
  c=0.164962
  d=0.031628
  Exponential Fit: $y=ae^{bx}$
  Coefficient Data:
  a=1.1846416 S=1.131
  b=0.5021062 R=0.99588

For both sets of results, the polynomial fit had a slightly higher correlation coefficient than the exponential fit. However, the standard error for the polynomial fit in data set 2 was smaller than for the exponential fit, but in data set 1 the standard error for the exponential fit was smaller than the polynomial fit.

Based on these results, the exponential fit model may be appropriate in some applications because it does not require inclusion of as many terms as the cubic function. This is because the exponential model provides almost the same accuracy (i.e., up to about the third decimal place) as that of the polynomial method, and it also has a physical interpretation of all the terms in it. Of course, the polynomial method or other approaches may be used in various applications as appropriate, as will be appreciated by those skilled in the art.

Generally speaking, if the data to be used in curve fitting does not appear to be approximated by a straight line, then there are often equations which can be used to fit the data very well. One potential type of curve to fit to the data is a polynomial. Polynomials can be applied without much forethought and they are typically successful in matching the shape of the graphed data. However, when a higher degree polynomial is chosen to fit the data, it may be difficult to determine a theoretical basis for the coefficients in the polynomial equation. It is desirable to have such a basis for why a particular model is chosen, and that model should have some type of physical interpretation of each of the parameters in it.

Advantages of using linearizable equations to fit data are notable. Typically, curves of this type are somewhat easier to understand or predict than polynomials. That is, proper choice of the curve to fit the data can lead to insight concerning underlying mechanisms which produce the data. Secondly, manipulations of these curves such as differentiation, integration, interpolation and extrapolation can be made more confidently than can those with polynomials. Third, linearizable curves often require fewer numbers of parameters for estimation of values than do polynomials. As a result, the normal matrix may be small and can be solved with a relatively high degree of accuracy. Thus, this reduces the need to solve large sets of linear equations which often have an undesirable property of ill-conditioning. Thus, for BER data, Applicants have determined that it is generally desirable to use nonlinear forms such as logarithms, inversions, and exponentials to find the linearizable curve to match the shape of the data before resorting to a higher degree polynomial.

Having generated the BER vs. TCH power level function for the initial channel based upon measured BER values within the target range, this function may then be used to advantageously perform a fast search for the desired BER and corresponding TCH power level value in each of the subsequent channels in a given frequency band. First, an estimated or starting TCH power level for the subsequent channel is chosen based upon the BER vs. TCH power level function and the desired BER, at Block 42. That is, an estimate of the TCH power level that will correspond to the desired BER in the subsequent channel is determined and used as a starting point to hone in on the actual TCH power level for the desired BER. For purposes of the present discussion, a desired BER of 2.44% will be assumed, although other desired BERs may be appropriate based upon the given standard or carrier requirement that is to be met, as will be appreciated by those skilled in the art.

It should be noted that the estimated TCH power level may be chosen based upon the path loss function noted above. That is, one approach to determining the estimated TCH power level for the subsequent channel is to use the TCH power level for the initial channel that corresponds to the desired BER (i.e., 2.44%) and offset this value by the difference between the initial and subsequent channel path loss values on the path loss function (or actual measured values if a path loss function is not used), as will be appreciated by those skilled in the art (Block 42').

Once the estimated TCH power level is determined, then the BER of the subsequent channel is measured based thereon, at Block 43. If the measured BER is not within the target BER range (e.g., 1.0 to 3.0%), then the above-described coarse step search may be used to determine a TCH power level that is within the range. If the measured BER is within the target range, it is compared with the desired BER value, and the difference (i.e., delta) therebetween is used along with the BER vs. TCH power level function to determine a next estimated TCH power level, at Block 44. From the above discussion of the TCH power level function, it will be appreciated by those skilled in the art that the next estimated TCH power level may be estimated according to the relationship $\Delta BER = bce^{bx} \Delta TCHlevel$, since the $\Delta BER$ and the coefficient b are known.

If the measured BER is not within a threshold range of the desired BER (e.g., ±0.15%), at Block 45, the steps described above with reference to Blocks 43 and 44 are repeated until a TCH power level corresponding to the desired BER (i.e., within the threshold range) is found, at Block 46, thus concluding the method illustrated in FIG. 3. Yet, if still further accuracy is desired, a linear approximation may be used, at Block 46'. More particularly, within a relatively small 0.3% BER range (i.e., the ±0.15% BER threshold range), the shape of the BER vs. TCH power level curve will be approximately linear. Therefore, this linear relationship may be used to provide still further accuracy, as will be appreciated by those skilled in the art.

Figure 2:
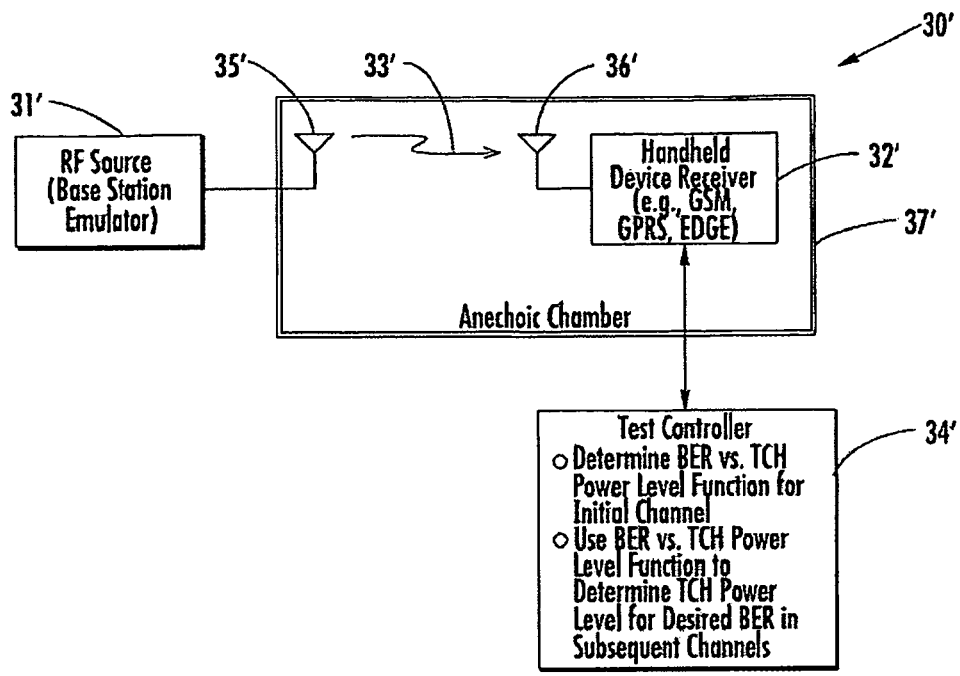
FIG. 2 is a schematic block diagram of an exemplary test system for measuring radiated RF receiver sensitivity in accordance with the invention.
Figure 5:
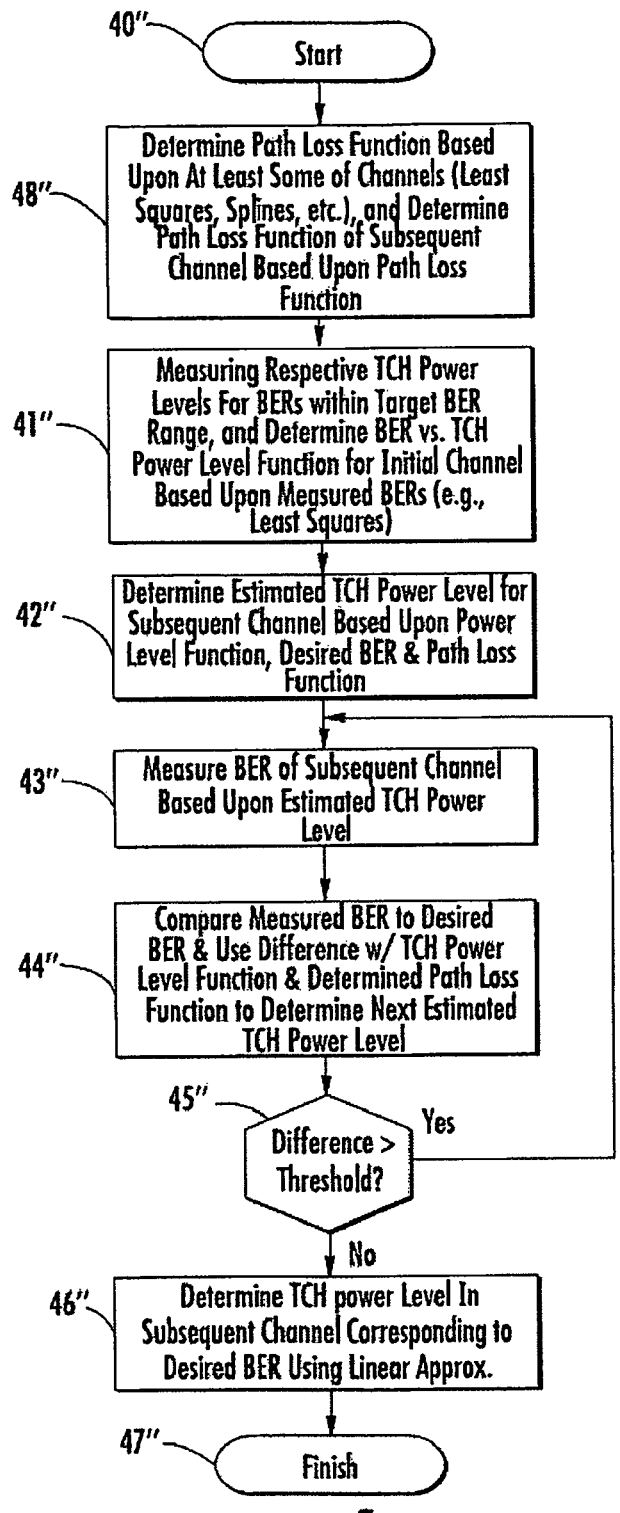

Turning now to FIGS. 2 and 5, a test system 30' and method for determining RF receiver radiated sensitivity are now described. The test system 30' includes the RF source 31' (e.g., a base station emulator), an RF controlled enclosed environment, and the wireless handheld device receiver 32'. As will be appreciated by those skilled in the art, an RF controlled enclosed environment is an electromagnetic (EM) wave shield environment, such as the illustrated EM anechoic chamber 37' (which may be a full or semi-anechoic chamber), a shield room or an RF enclosure. An antenna 35' connected to the RF source 31' is positioned within the anechoic chamber 37' and connected to the RF source 31' by a coaxial cable to simulate a base station. An antenna 36' for the wireless handheld device is also positioned within the anechoic chamber 37' and connected to the handheld receiver 32'. It should be noted that in typical tests the handheld receiver 32' and antenna 36' will be carried by a device housing, but these components may be tested without the device housing if desired.

Generally speaking, the radiated receiver sensitivity search is the same as that described above for a conducted receiver sensitivity search with the exception of the path loss determination process. More specifically, the relationship between path loss values for a plurality of wireless channels in a frequency band will typically not be a linear function, as is the case for the RF cable 33. This is because path loss can be affected by factors such as antenna gain, antenna directivity and the measurement environment. Typically the path loss will be different for different wireless channels.

Even so, a path loss function may still be determined for the frequency band using similar approaches to those described above for determining the BER vs. TCH power level function (e.g., a least squares approximation, etc.), at Block 48". By way of example, the five-step path loss search described above with reference to FIG. 13 may be performed on a subset of the channels within the band, such as every 10th channel. This approach advantageously allows an accurate path loss function to be determined for the entire band to provide path loss estimates for every channel, yet without taking the time to individually measure the path loss of each channel. The path loss function is then used in determining the estimated TCH power level for the subsequent channel, at Block 42", as described further above.

Figure 6:
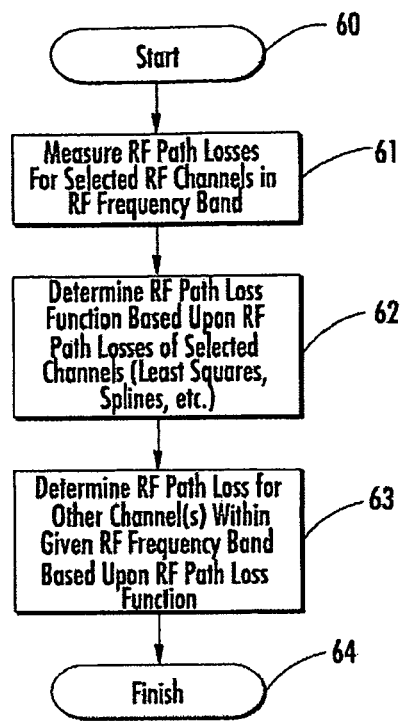
FIG. 6 is a flow diagram of an exemplary method for determining RF path loss in accordance with the invention.

The path loss determination process will now be described in further detail with reference to FIG. 6. Beginning at Block 60, RF path losses are measured for at least some of the RF channels within the RF frequency band, at Block 61. Using the above-noted example, path loss is measured every M channels. By way of example, M may be 10, although other intervals may also be used. An RF path loss function is determined based upon the measured RF path losses of the at least some RF channels, at Block 62, and an RF path loss for at least one other channel within the given RF frequency band is determined based upon the RF path loss function, at Block 63, thus concluding the illustrated method (Block 64).

The choice of M generally depends on the linearity of the system. That is, a linear system would only require two points to be measured, regardless of the number of the channels or frequency bandwidth. As the non-linearity or order of the system increases, the order of a single curve fitting equation should correspondingly increase to obtain a proper fitting. A least squares method, or other non-linear fitting methods, may be used. Many methods use matrices inversion where size is relative to the order of the equation. An inversion is increasingly complex and error prone as its dimensions increase. The least squares method requires a matrices inversion. Due to the nature of radio systems over large frequency spans, higher order path loss responses can exist.

Path loss curve fitting may also be performed using a plurality of splines. That is, many partial equations replace one complete equation. Sets of consecutive points (e.g., four consecutive points) are grouped on a rotating basis. For example, the first four points are used for generating the first spline series, the 2nd to 5th points for the second spline series, and so on. All but the first and last spline series use only intermediate points (e.g., the equation from points 2 to 3) as valid fitting equations. Using intermediate points for the equations leaves the first and last two points without respective equations. Different spline methods vary first and last spline construction. One method, an extrapolated cubic spline, uses the first two splines of the first series (e.g., points 1 to 2), the last two splines of the last series (e.g. points 3 to 4). Other suitable spline fit methods may also be used, as will be appreciated by those skilled in the art.

Figure 16:
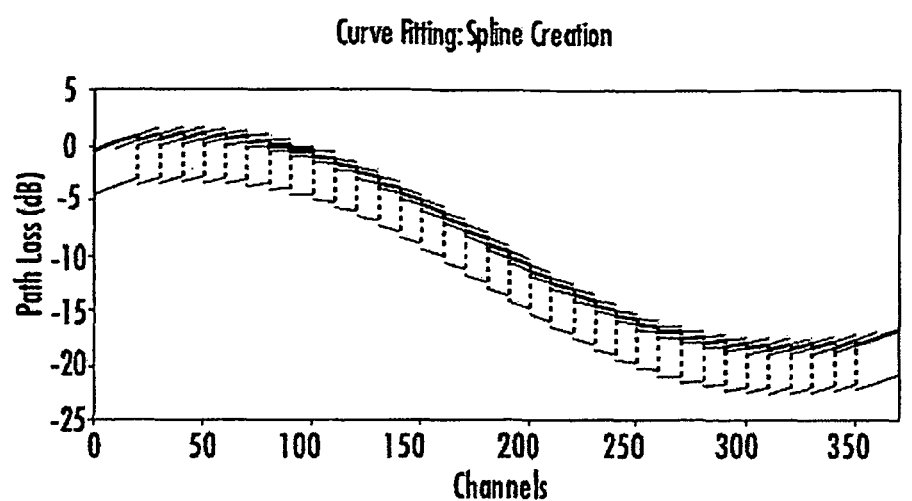
FIG. 16 is a graph illustrating sine waves approximated using spline fitting.

Referring to FIG. 16, two sine wave curves produced from respective series of splines are shown. Each curve is a spline fitting of a sine wave. Each line is one spline series within the spline fitting. The series are offset by −0.5 dB per spline series to show the overlapping spline series. Without the offset, the consecutive spline series would overlap. Data was taken from every 10th point. The upper figure is constructed of four point splines. The lower figure shows the upper spline with only the used data transposed, as mentioned above. The respective sine curves are offset by 4 dB for clarity purposes. Bold and dotted lines show the intermediate line transposition of the upper figure to the lower.

As noted above, path loss curve fitting reduces the measurement time of non-measured channels. Time is improved in systems with consecutive channel path loss difference exceeding the interpolation error. Linear interpolation will advantageously result in typical accuracy of under ±0.1 dB. The path loss method described above with reference to FIG. 6 may be used for radiated and conducted path loss measurements, as will be appreciated by those skilled in the art.

Another factor that may need to be accounted for in certain path loss/receiver sensitivity test measurements is the hysteresis of the particular handheld device under test, although this may be omitted in some embodiments. More particularly, receiver path loss is measured by comparing base station emulator TCH level output against the signal received by the handheld device and relayed to the emulator as RSSI. Consecutive 0.1 dB adjustments of the emulator's amplification will detect a region at which the change in amplification yields a change in RSSI. At this "edge" point the radio could oscillate between two RSSI readings with no amplification change. This edge point may be caused by system error, changing position or changing signal intensity, for example. As the RSSI readings oscillate, the handheld device could respond by changing its transmitter power in a similar oscillatory pattern, affecting the handheld power management. As such, many handheld devices manufacturers implement software within each mobile handheld device to change the edge to account for this problem.

Figure 17:
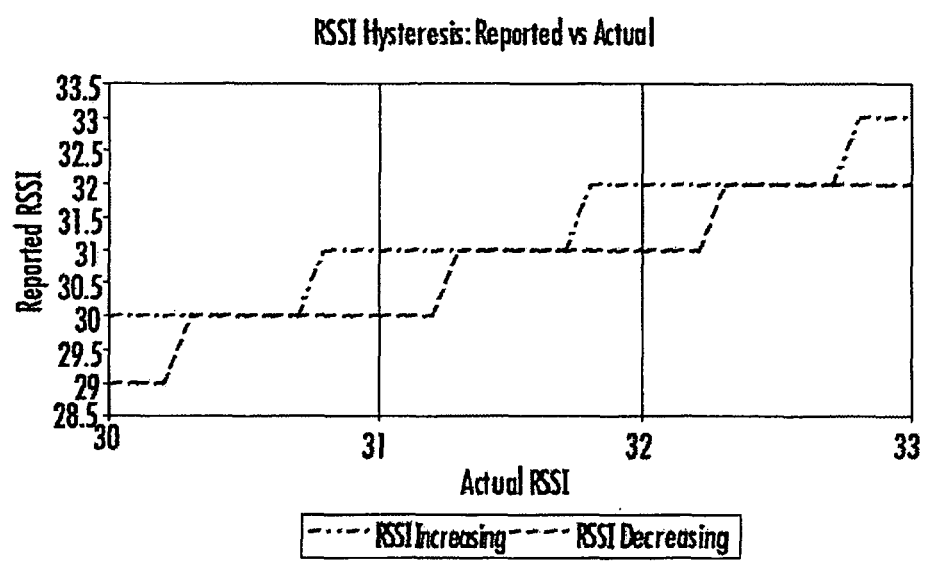
FIG. 17 is a graph illustrating handheld device hysteresis switching.

More particularly, the problematic single RSSI edge point is divided into two different values. These two points straddle the actual edge point by an amount typically less than 0.5 dB, which is set within the handheld. As the received TCH level changes, the RSSI edge point will be reported prematurely, as shown in FIG. 17. This dual-edge system, known as hysteresis, decreases the likelihood of any oscillations within the RSSI and TX power control. As the device RSSI decreases, the reported RSSI to the base station emulator will change in such a way as to remove any oscillations if the device RSSI increases by only a small amount.

While the hysteresis prevents oscillations, it also creates an offset from the true RSSI edge. For a known device with known hysteresis, the value can be applied as an offset to each channel. For an unknown device, the hysteresis may need to be determined using a stepping algorithm, and then factored in to each path loss channel. The hysteresis is removed to obtain the true edge point. The hysteresis typically applies to all channels the same within a given band.

Figure 7:
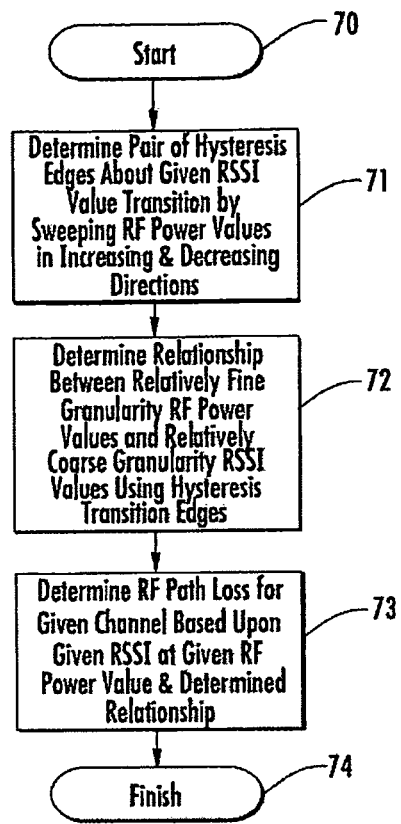
FIGS. 7 and 8 are flow diagrams of exemplary methods for determining RF path loss between an RF source and an RF receiver with hysteresis in accordance with the invention.

One exemplary method for determining path loss including a hysteresis search is now described with reference to FIG. 7. It should be noted that this approach may be used either for conducted path loss or radiated path loss, as will be appreciated by those skilled in the art. Beginning at Block 70, a pair of hysteresis edges is determined about a given RSSI value transition at the RF receiver by sweeping RF power values transmitted from the RF source in increasing and decreasing directions, at Block 71. A relationship is determined between the relatively fine granularity RF power values and the relative coarse granularity RSSI values using the hysteresis transition edges, at Block 72. More particularly, since the RSSI transition point for the receiver 32 or 32' is located half-way between the hysteresis transition edges, the location of the actual RSSI transition relative to the TCH power level may be determined once the TCH power levels corresponding to the hysteresis transition edges are known. RF path loss for a given channel may then be determined based upon a given RSSI at a given RF power value and the determined relationship between the relatively fine granularity RF power values and the relative coarse granularity RSSI values, at Block 73, thus concluding the illustrated method (Block 74).

The scan finds the edge point as the TCH level is increased and decreased. By way of example, the coarse granularity RSSI values may be in 1.0 dB increments (i.e., the reported accuracy of the handheld receiver), while the relatively fine granularity increments may be 0.1 dB (i.e., the accuracy of the internal receiver amplifier(s)). To find the first edge, the internal amplification of the receiver may be increased in +0.1 dB increments until the edge is found. Then, a +1.0 dB step may be taken, followed by a series of −0.1 dB steps until the second edge is found. The actual RSSI value will be located half-way between the two edges. It should be noted that the direction first measured has no bearing on the results, as either edge can be found first. That is, the first hysteresis edge could be found with −0.1 dB steps, followed by a −1.0 dB step and +0.1 dB steps to find the second hysteresis edge, as will be appreciated by those skilled in the art.

Figure 8:
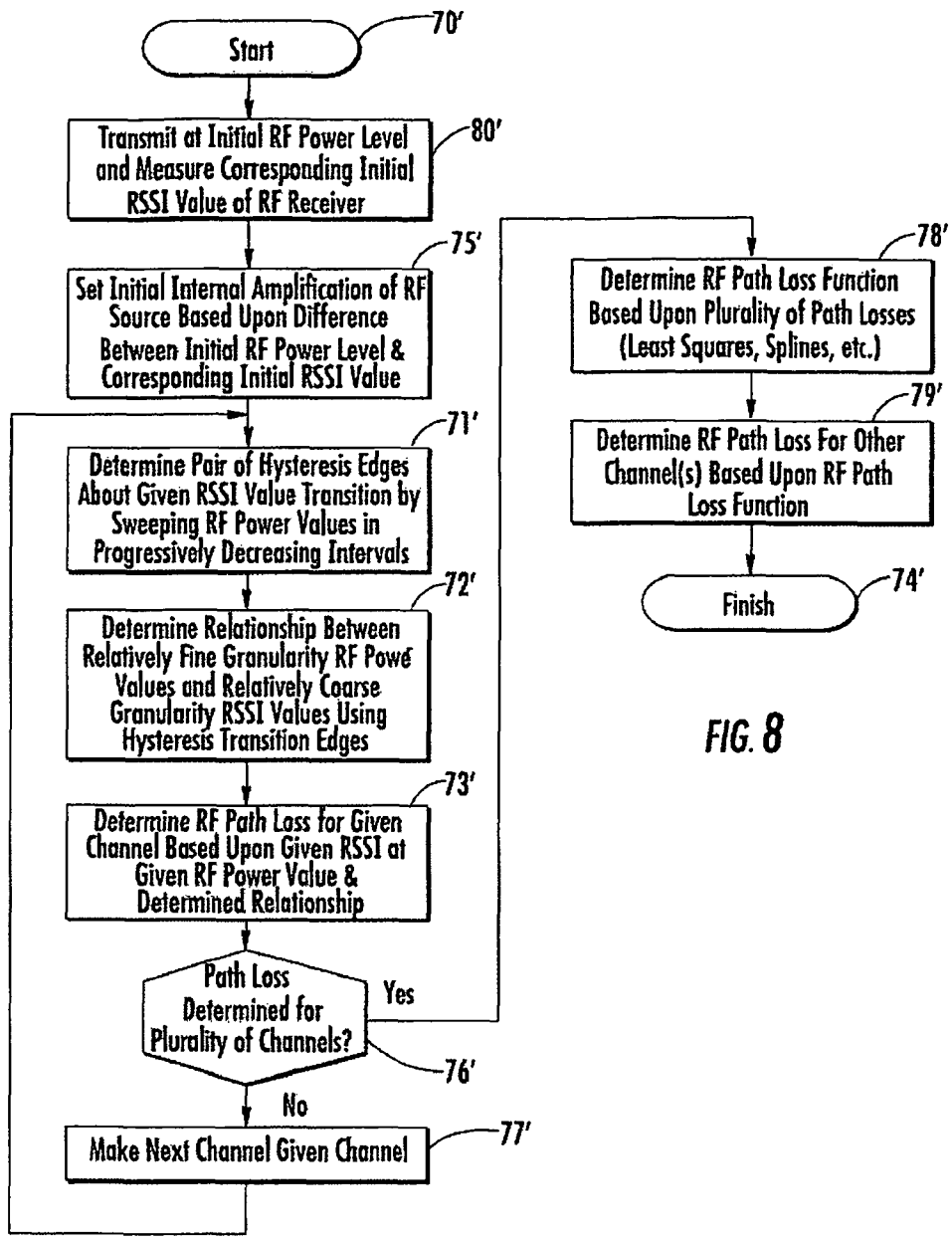

Further aspects of the test method are now described with reference to FIG. 8. The RE source 31 or 31' transmits RF power values at a relatively fine granularity, and the RF receiver 32 or 32' generates RSSI values at a relatively coarse granularity and have an unknown hysteresis about each transition between adjacent RSSI values, as noted above. A signal is transmitted from the RF source 31 or 31' at an initial RF power level, and a corresponding initial RSSI value of the RF receiver 32 or 32' is measured, at Block 80'. An initial internal amplification of the RF source 31 or 31' is set based upon a difference between the initial RF power level and the corresponding initial RSSI value, at Block 75', to thereby calibrate the RF receiver 32 or 32' with the RE source.

In addition, the method may also include repeating the three determining steps for at least one other given RF channel in the given RF frequency band to determine a plurality of RF path losses, at Blocks 76' and 77', and determining an RF path loss function based upon the plurality of RF path losses at Block 78', using a least squares algorithm, a plurality of splines, etc., as discussed further above. An RF path loss for at least one other channel within the given RF frequency band may then be determined based upon the RF path loss function, at Block 79'.

Figure 19:
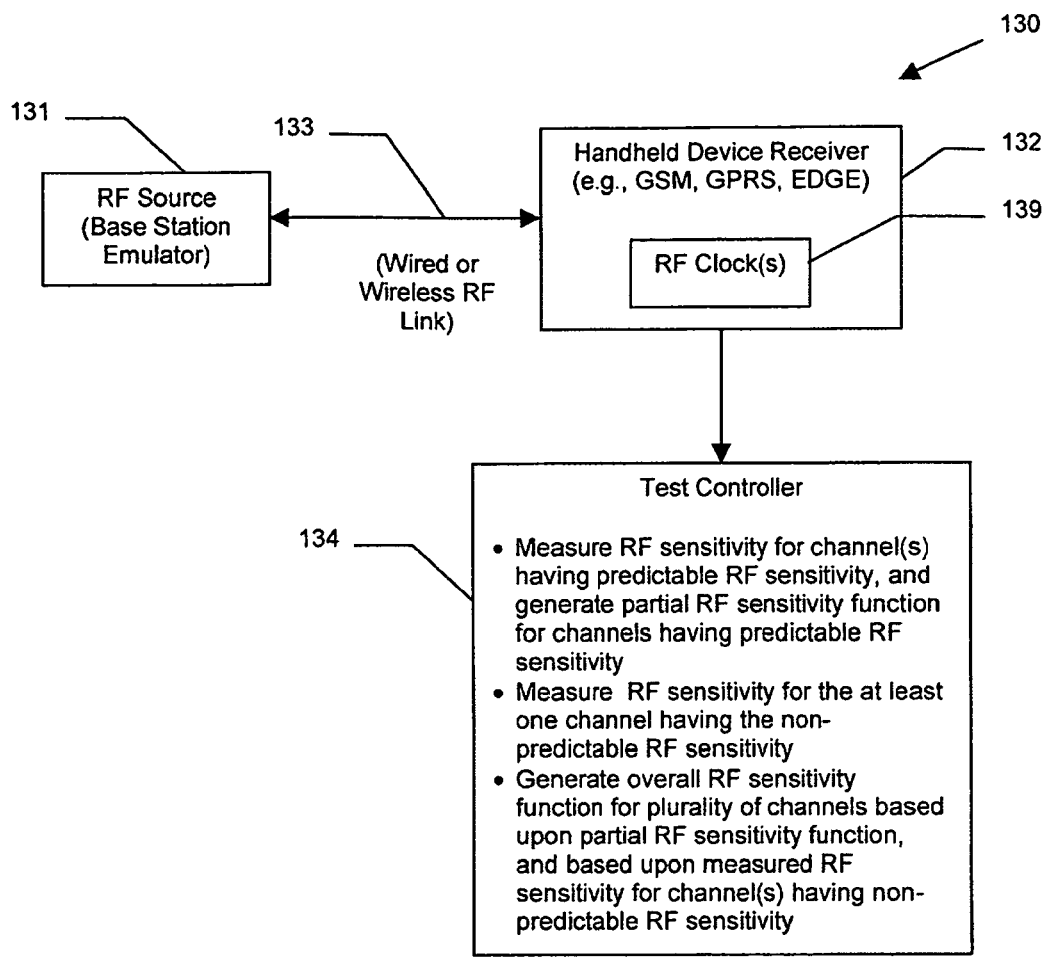
FIG. 19 is a schematic block diagram of another exemplary test system for determining RF receiver sensitivity in accordance with an alternative embodiment.
Figure 20:
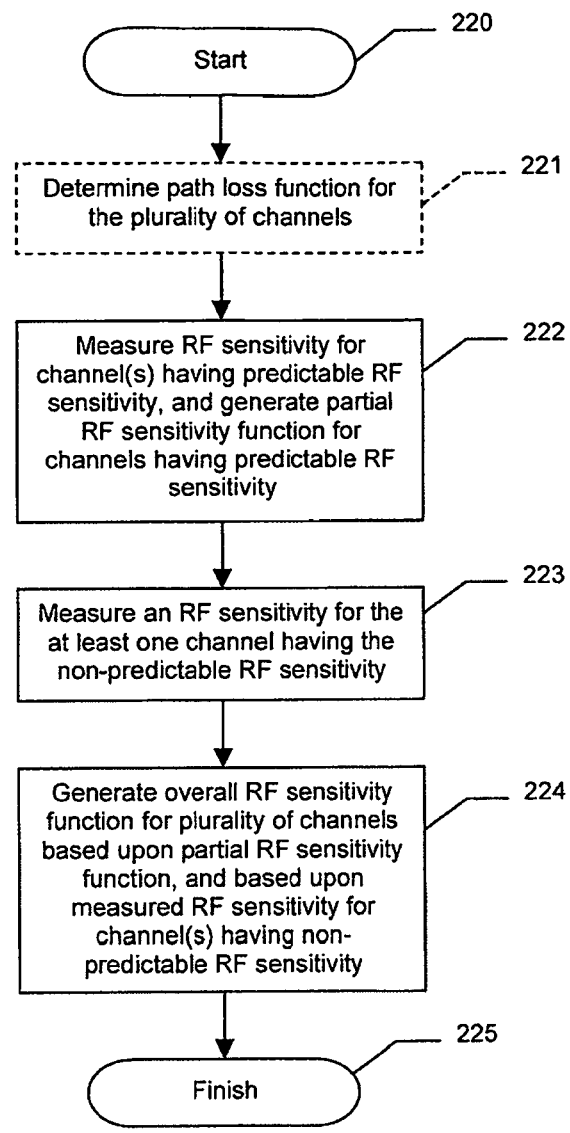
FIGS. 20, 21A and 21B are flow diagrams of other exemplary methods for RF receiver sensitivity measurement in accordance with an alternative embodiment.
Figure 21A:
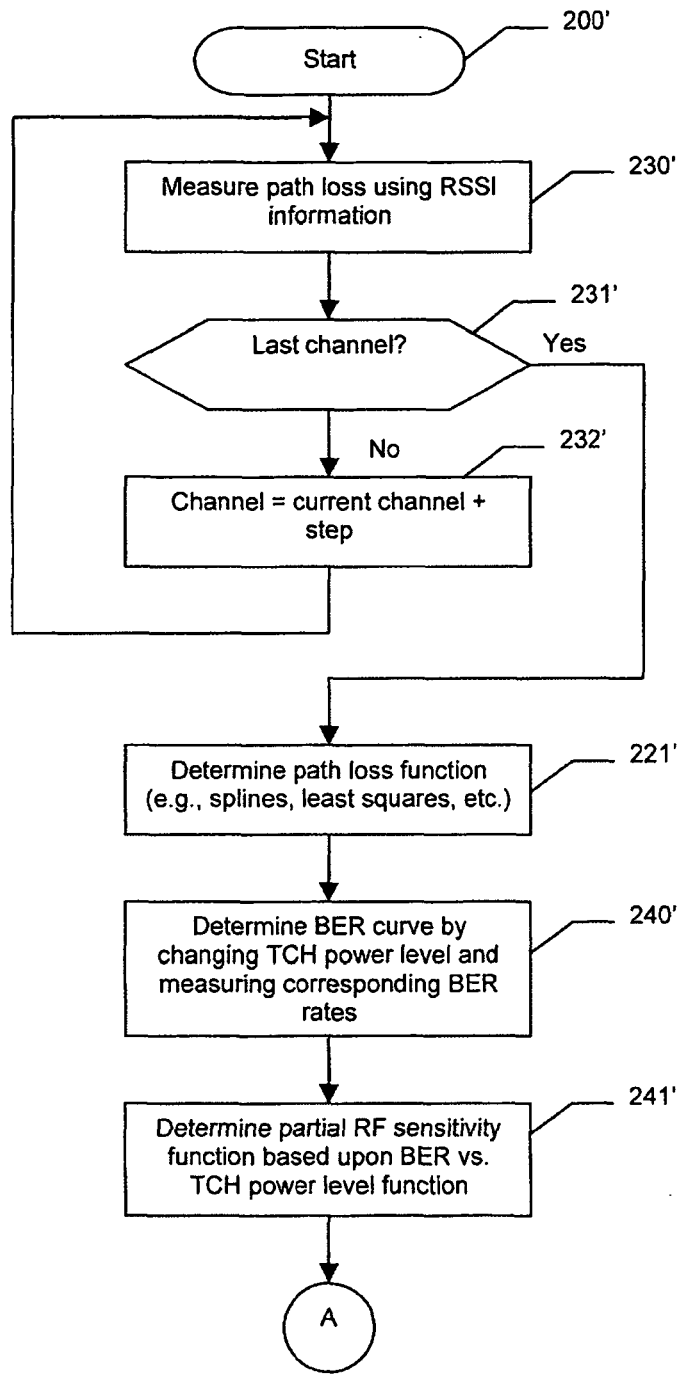
Figure 21B:
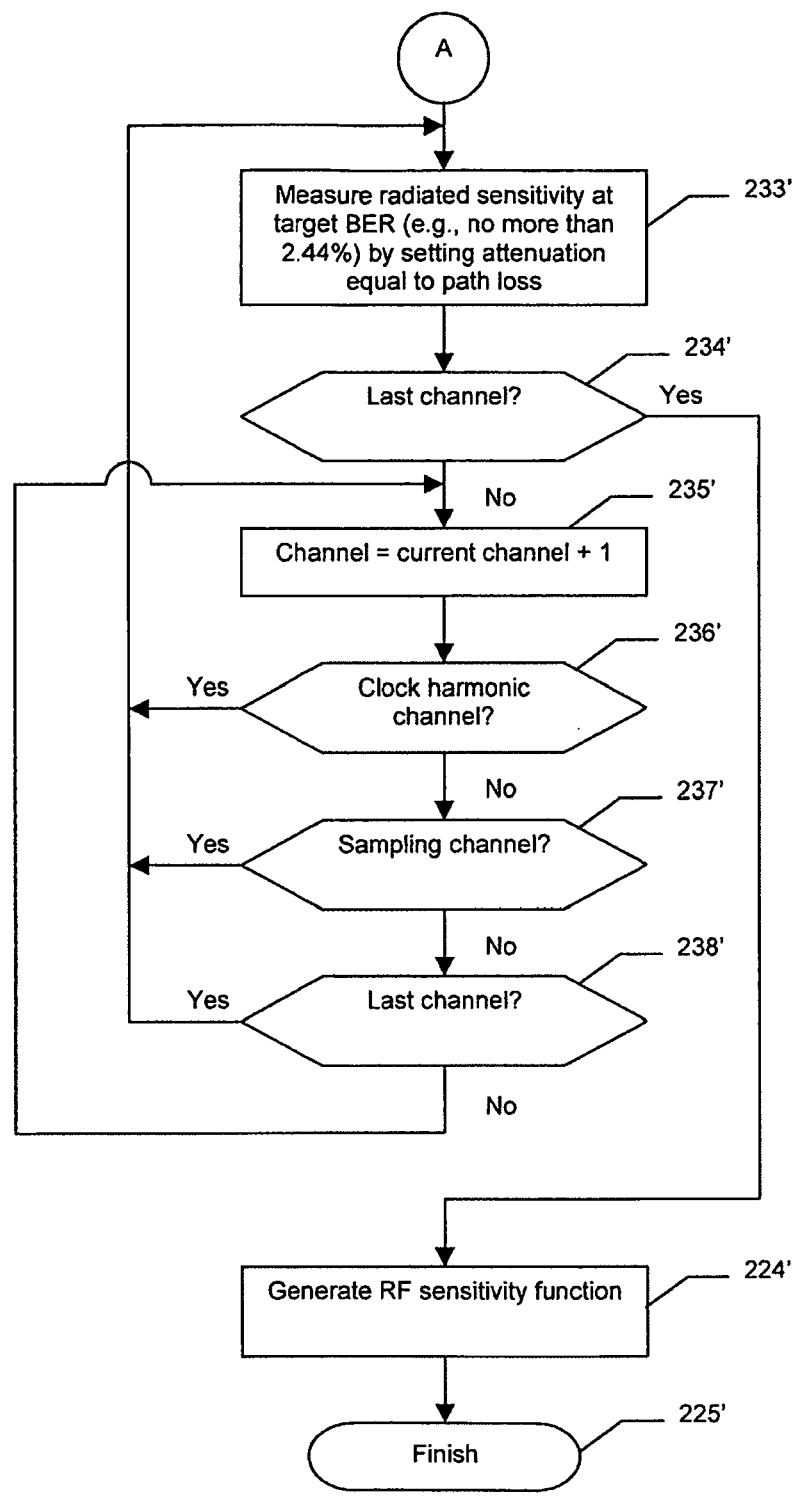

Turning to FIGS. 19-21, another exemplary test system 130 and related methods for determining RF sensitivity is now described. The test system 130 illustratively includes an RF source 131, an RF receiver 132 (e.g., a handheld cellular device receiver), an RF communications link 133 (either wired or wireless) coupling the RF source to the RF receiver, and a test controller 134 coupled to the RF receiver, similar to those discussed above. The test system 130 may advantageously be used for measuring conducted as well as radiated sensitivity.

Beginning at Block 220, the test controller 134 optionally determines a path loss function for the plurality of channels, at Block 221. As noted above, path loss of the measurement system typically will need to be compensated to measure sensitivity, although this may not necessarily be the case in all embodiments, as will be appreciated by those skilled in the art. Again, this may be done by measuring path losses using the RSSI information from the RF receiver 132, and stepping through selected ones of the channels (e.g., every $10^{th}$ channel, etc.) until a last channel to be measured is reached, at Blocks 230'-232'. From the subset of channel path loss values measured, the path loss function may be generated using a spline or LMS-based approach (Block 221'), as discussed above, although other models or functions may also be used as appropriate based upon the physical characteristics of the curve associated with the given communications format(s).

In the exemplary embodiment, the receiver 132 illustratively includes one or more electronic RF receiver clocks 139, as is typical with most cellular receivers, for example. While most channels will ordinarily have a predictable RF sensitivity associated therewith that can be determined using a BER versus TCH power level function or other approaches as described above, in some instances the harmonic frequencies from the RF receiver clock(s) 139 may result in interference on corresponding frequency channels, making their sensitivity unpredictable. Accordingly, in such instances it may be advantageous to separately measure or determine sensitivities for the predictable and non-predictable channels, and combine the results of each using an overall sensitivity function for the receiver. One skilled in the art will appreciate that clocks are not the only source of harmonic frequencies, and that there may be other sources of harmonic frequencies that result in non-predictable channels.

With respect to the channels having the predictable sensitivity, their sensitivity values may be determined by measuring the sensitivity value for one or more channels, and using the measured value(s) to generate a partial RF sensitivity function or curve g(x) modeling all of the sensitivity values for the channels with predictable sensitivities, at Block 222. One approach for dong so is to use the above-described BER versus TCH power level function approach, i.e., by measuring respective TCH power levels for a plurality of BERs within a target BER range for an initial channel, and determining the BER versus TCH power level function based upon the measured BERs in the target BER range, at Block 240'. The BER versus TCH power level function is then used to determine the sensitivity values for the remaining channels having the predictable sensitivity, as discussed above, to thereby generate the partial RF sensitivity function g(x), at Block 241'.

The BER and traffic channel relative power level curve function is based on the fact that the relative level of the traffic channel vs. BER is determined by the modulation method and DSP code for the given RF receiver type. The curve can be constructed on one channel using the LMS method, as well as other algorithms or functions that closely model the physical characteristics of the receiver in question, as will be appreciated by those skilled in the art.

It should be noted that sensitivity values for all of the channels with predictable sensitivity values need not be determined using the BER vs. TCH power level function in all embodiments. That is, a subset of these sensitivities may be determined using the BER vs. TCH power level function, and then the subset of values in turn used to determine the partial RF sensitivity function g(x), from which the remaining predictable sensitivity values may be estimated or approximated, as will be appreciated by those skilled in the art. Moreover, the channels from which the subset of sensitivity values are determined may be equally spaced apart, or they may be at non-equal equal intervals from one another.

One exemplary method for determining a function from a set of equidistant data points that may be used for generating the partial RF sensitivity function g(x) is set forth in an article by Van Blaricum et al. entitled "A Technique for Extracting the Poles and Residues of a System Directly from Its Transient Response," IEEE Transactions on Antenna and Propagation, Vol. AP-23, No. 6, November 1975, which is hereby incorporated herein in its entirety by reference. In particular, this article provides an approach for systematically deriving complex poles and residues of a structure from a set of time-domain data. The method is based on Prony's algorithm which involves the inversion of two matrices and a solution of the zeros of an nth degree polynomial, where n is the number of desired poles. Of course, other suitable approaches for generating the partial RF sensitivity function g(x) may also be used, as will be appreciated by those skilled in the art.

In accordance with an alternative approach, rather than using the BER versus TCH power level function, a subset of the channels with the predictable sensitivity may be directly measured using the above-described traditional measurement approach, and the partial RF sensitivity function g(x) is then generated from this subset of measured sensitivity values (e.g., using the method described above in the Van Blaricum et al. article, etc.). For example, the sensitivity of twenty sampling channels within a frequency band may be measured, and the partial sensitivity function g(x) is generated based upon these twenty values (i.e., the function is fitted to these values). Of course, other numbers of sampling channels may be used in different embodiments. Generally speaking, an initial starting value for the number of predictable channels may be twice the number of harmonic clock frequency channels, and more channel measurements may be added as necessary for the given embodiment.

With respect to the non-predictable clock harmonic channels, e.g., the harmonic frequencies from the clock(s) 139, the harmonic frequencies may result in interference on corresponding frequency channels when attempting to measure TCH levels associated with the target BER, as will be understood by those skilled in the art. Accordingly, the test controller 132 in the exemplary embodiment advantageously measures an RF sensitivity for the channel(s) having the non-predictable RF sensitivity, at Block 223. That is, these non-predictable channels may be measured in a manual or traditional fashion (i.e., by direct measurement and not prediction based on a function, etc.). However, in the illustrated embodiment they are estimated based upon the BER versus TCH power level function, once initial sweep measurements are taken to determine the unpredictable offset of the function for the channel. That is, the sensitivity for these channels will still follow the determined BER versus TCH power level function for the frequency band in question, but it will be offset by an unpredictable level that will typically need to be determined through sweep measurements. In one exemplary embodiment, the sweep measurements could begin at an RSSI value of −90 dB, although other starting values could also be used in different embodiments.

Typically, device manufacturers will know which channels fall in the non-predictable category, as they are aware of the operating frequencies of the channels as well as the harmonic frequencies, e.g., clock frequencies, present within the device. Accordingly, the test controller 132 can be set to separately measure these channels, for example. That is, the test controller 134 steps through the channels and measures the RSSI values at the target BER for the clock harmonic channels by setting attenuation equal to path loss, as noted above, at Blocks 233'-236'.

In some embodiments, it may also be desirable to consider the channels directly adjacent to a clock harmonic channel to also be non-predictable, as these adjacent frequencies may also have higher noise levels due to adjacent frequency filter imperfection or phase noise of the interference frequencies, as will be appreciated by those skilled in the art. In such case, these adjacent sampling channels are measured similarly to the harmonic channels, at Block 237'. The sensitivity may also be measured in this fashion for the last channel, at Block 238', if desired, but this need not be the case in all embodiments.

An overall RF sensitivity function may then be generated for the plurality of channels based upon the partial RF sensitivity function, and based upon the measured RF sensitivity for the at least one channel having the non-predictable RF sensitivity, at Block 224, thus concluding the method illustrated in FIG. 20 (Block 225). With respect to the final sensitivity function model, the BER versus TCH curve will speed up the sensitivity measurements for channels with predictable sensitivity values (and potentially non-predictable channels as well) once the initial value of the sensitivity is determined, although the BER versus TCH power level function need not be used in all embodiments, as noted above.

The final sensitivity function model provides a good initial value for sensitivity measurement verification. It can also be used directly as a final sensitivity value for radio development, as will be appreciated by those skilled in the art. Again, the final RF sensitivity function accounts for interference frequencies (e.g., clock harmonic channels) for which the sensitivity is not necessarily predictable, and rather needs to be determined using manual measurements, as discussed above. One exemplary function for the sensitivity model is as follows:

$$F(x) = \sum_i \int_{-\infty}^{+\infty} M(x) \delta(x - x_i) dx + f(x)$$

where $$f(x) = \begin{cases} 0 & x = x_i \\ g(x) & x \neq x_i, \end{cases}$$

and $x_i$ are interference frequencies. More particularly, the first term of the function $M(x)\delta(x-x_i)dx$ represents the contribution of the interfering (i.e., clock harmonic) channels, and the second term $f(x)$ (and, more specifically, $g(x)$) represents the contribution of the measured/estimated sensitivity values for the predictable channels, i.e., the partial RF sensitivity function. That is, the first term will be zero when x is not an interfering channel (i.e., $x \neq x_i$), and the second term will be zero when x is an interfering frequency (i.e., $x=x_i$).

The above-described approach may therefore be considered as a physical-model based radio sensitivity sweep method, as it takes advantage of the predictable physical characteristics of the sensitivity for the channels in a frequency band, which can be modeled using the BER versus TCH function. The physical model-based radio sensitivity sweep method advantageously uses the model or function of the sensitivity which applies to the predictable sensitivity channels to significantly reduce the radio sensitivity sweep test time as compared to a traditional manual measurement approach.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A test method for a radio frequency (RF) receiver operable over a plurality of channels, the method comprising:
   determining a partial RF sensitivity function for a subset of channels having a predictable RF sensitivity;
   determining an RF sensitivity for at least one channel having a non-predictable RF sensitivity; and
   determining an overall RF sensitivity function for the plurality of channels based upon the partial RF sensitivity function, and the RF sensitivity for the at least one channel having the non-predictable RF sensitivity.

2. The test method of claim 1 further comprising determining a bit error rate (BER) versus traffic channel (TCH) power level function for at least one channel having the predictable RF sensitivity; and wherein determining the partial RF sensitivity function comprises determining the partial sensitivity function based upon the BER versus TCH power level function.

3. The test method of claim 2 wherein determining the BER versus TCH power level function for the at least one channel having the predictable RF sensitivity comprises:
   determining respective TCH power levels for a plurality of BERs within a target BER range; and
   determining the BER versus TCH power level function based upon the BERs in the target BER range.

4. The test method of claim 1 wherein the RF receiver comprises at least one RF receiver clock; and wherein the at least one channel having the non-predictable RF sensitivity comprises at least one channel having a frequency corresponding to a harmonic frequency of the at least one RF receiver clock.

5. The test method of claim 1 further comprising determining a path loss function for the plurality of channels; and wherein determining the partial RF sensitivity function comprises determining the partial RF sensitivity function based upon the RF sensitivity for at least one channel having the predictable RF sensitivity and the path loss function.

6. The test method of claim 5 wherein determining the path loss function comprises determining the path loss function based upon at least some of the plurality of channels.

7. The test method of claim 5 wherein determining the path loss function comprises determining the path loss function based upon a least squares algorithm.

8. The test method of claim 5 wherein determining the path loss function comprises determining the path loss function using a plurality of splines.

9. The test method of claim 1 wherein the RF receiver comprises at least one of a Global System for Mobile Communications (GSM) receiver, a General Packet Radio Service (GPRS) receiver, and an Enhanced Data Rates for Global System for Mobile Communications (GSM) Evolution (EDGE) receiver.

10. A test method for a radio frequency (RF) receiver of a mobile wireless communication device, the RF receiver operable over a plurality of channels, the method comprising:
wirelessly coupling the RF receiver of the mobile wireless communications device to an RF source; and
operating a test controller coupled to the RF source and mobile wireless communications device for at least
determining a partial RF sensitivity function for a subset of channels having a predictable RF sensitivity,
determining an RF sensitivity for at least one channel having a non-predictable RF sensitivity, and
determining an overall RF sensitivity function for the plurality of channels based upon the partial RF sensitivity function, and the RF sensitivity for the at least one channel having the non-predictable RF sensitivity.

11. The test method of claim 10 further comprising operating the test controller for determining a bit error rate (BER) versus traffic channel (TCH) power level function for at least one channel having the predictable RF sensitivity; and wherein determining the partial RF sensitivity function comprises determining the partial sensitivity function based upon the BER versus TCH power level function.

12. The test method of claim 11 wherein determining the BER versus TCH power level function for the at least one channel having the predictable RF sensitivity comprises:
determining respective TCH power levels for a plurality of BERs within a target BER range; and
determining the BER versus TCH power level function based upon the BERs in the target BER range.

13. The test method of claim 10 wherein the RF receiver comprises at least one RF receiver clock; and wherein the at least one channel having the non-predictable RF sensitivity comprises at least one channel having a frequency corresponding to a harmonic frequency of the at least one RF receiver clock.

14. The test method of claim 10 further comprising operating the test to controller for determining a path loss function for the plurality of channels; and wherein determining the partial RF sensitivity function comprises determining the partial RF sensitivity function based upon the RF sensitivity for at least one channel having the predictable RF sensitivity and the path loss function.

15. The test method of claim 14 wherein determining the path loss function comprises determining the path loss function based upon at least some of the plurality of channels.

16. The test method of claim 14 wherein the RF receiver comprises at least one of a Global System for Mobile Communications (GSM) receiver, a General Packet Radio Service (GPRS) receiver, and an Enhanced Data Rates for Global System for Mobile Communications (GSM) Evolution (EDGE) receiver.

17. A test system for a radio frequency (RF) receiver operable on a plurality of channels, the test system comprising:
an RF source; and
a test controller configured to cooperate with said RF source and the RF receiver for at least
determining a partial RF sensitivity function for a subset of channels having a predictable RF sensitivity,
determining an RF sensitivity for at least one channel having a non-predictable RF sensitivity, and
determining an overall RF sensitivity function for the plurality of channels based upon the partial RF sensitivity function, and the RF sensitivity for the at least one channel having the non-predictable RF sensitivity.

18. The test system of claim 17 wherein said test controller is further configured to determine a bit error rate (BER) versus traffic channel (TCH) power level function for at least one channel having the predictable RF sensitivity; and wherein said test controller is configured to generate the partial RF sensitivity function also based upon the BER versus TCH power level function.

19. The test system of claim 18 wherein said test controller is configured to determine the BER versus TCH power level function for the at least one channel by at least:
determining respective TCH power levels for a plurality of BERs within a target BER range; and
determining the BER versus TCH power level function based upon the BERs in the target BER range.

20. The test system of claim 17 wherein the RF receiver comprises at least one RF receiver clock; and wherein the at least one channel having the non-predictable RF sensitivity comprises at least one channel having a frequency corresponding to a harmonic frequency of said at least one RF receiver clock.

21. The test system of claim 17 wherein said test controller is further configured to determine a path loss function for the plurality of channels; and wherein said test controller is configured to generate the partial RF sensitivity function based upon the RF sensitivity for at least one channel having the predictable RF sensitivity and the path loss function.

* * * * *